(12) United States Patent
Suyal

(10) Patent No.: US 11,249,241 B2
(45) Date of Patent: Feb. 15, 2022

(54) DIFFUSIVE REFLECTOR FOR A LIGHTING APPARATUS

(71) Applicant: OPTRICAL LIMITED, South Yorkshire (GB)

(72) Inventor: Navin Suyal, South Yorkshire (GB)

(73) Assignee: OPTRICAL LIMITED, South Yorkshire (GB)

( * ) Notice: Subject to any disclaimer, the term of this patent is extended or adjusted under 35 U.S.C. 154(b) by 0 days.

(21) Appl. No.: 16/757,596

(22) PCT Filed: Oct. 22, 2018

(86) PCT No.: PCT/GB2018/053043
§ 371 (c)(1),
(2) Date: Apr. 20, 2020

(87) PCT Pub. No.: WO2019/077375
PCT Pub. Date: Apr. 25, 2019

(65) Prior Publication Data
US 2021/0072454 A1  Mar. 11, 2021

(30) Foreign Application Priority Data

Oct. 21, 2017 (GB) ...................... 1717331

(51) Int. Cl.
*F21V 8/00* (2006.01)
(52) U.S. Cl.
CPC ......... *G02B 6/0061* (2013.01); *G02B 6/0036* (2013.01); *G02B 6/0041* (2013.01); *G02B 6/0051* (2013.01); *G02B 6/0055* (2013.01)
(58) Field of Classification Search
CPC .. G02B 6/0061; G02B 6/0036; G02B 6/0041; G02B 6/0051; G02B 6/0055
See application file for complete search history.

(56) References Cited

U.S. PATENT DOCUMENTS

| 8,279,371 B2 | 10/2012 | Song et al. |
| 2005/0140847 A1* | 6/2005 | Jeon ..................... G02B 6/0036 349/62 |

(Continued)

FOREIGN PATENT DOCUMENTS

| JP | H07161216 A | 6/1995 |
| JP | H1021720 A | 1/1998 |
| KR | 101392506 B1 | 5/2014 |

OTHER PUBLICATIONS

International Search Report for PCT Application No. PCT/GB2018/053043 dated Jan. 28, 2019, 3 pages.

(Continued)

*Primary Examiner* — Bryon T Gyllstrom
*Assistant Examiner* — Christopher E Dunay
(74) *Attorney, Agent, or Firm* — Hoffman Warnick LLC

(57) ABSTRACT

A diffusive reflector for a lighting apparatus comprising a backing part upon a surface of which is disposed an interface part(s) wherein the interface part(s) is at least partially diffusively reflective optically and/or the backing part is diffusively reflective optically. The interface part(s) is formed with a plurality of separate protrusions each adapted for making a separate respective contact interface with a surface of a light guide panel of the lighting apparatus to optically couple the backing part to the light guide panel via the interface part(s). The interface part(s) comprises an optically transmissive interface material arranged to form said contact interface such that the interfacial energy thereof is reduced so that air is driven from the contact interface. Consequently, the critical angle for total internal reflection of light guided by the light guide panel is increased at said contact interface.

20 Claims, 6 Drawing Sheets

(56) References Cited

U.S. PATENT DOCUMENTS

| | | | |
|---|---|---|---|
| 2008/0043490 A1* | 2/2008 | Coleman | G02F 1/133606 |
| | | | 362/623 |
| 2012/0147627 A1* | 6/2012 | Pan | G02B 6/0051 |
| | | | 362/624 |
| 2014/0116607 A1 | 5/2014 | Chiu et al. | |
| 2015/0277024 A1* | 10/2015 | Hsu | G02B 6/0036 |
| | | | 362/612 |
| 2018/0321555 A1* | 11/2018 | Hata | G02B 6/0055 |
| 2019/0204497 A1* | 7/2019 | Jeon | G02B 6/0038 |
| 2020/0207788 A1* | 7/2020 | Oh | C09K 11/06 |
| 2020/0225403 A1* | 7/2020 | Chang | G02B 6/0038 |

OTHER PUBLICATIONS

VikuitiTM Enhanced Specular Reflector—ESR, 3M Optical Systems at Optical Systems Division, 3M Center 2010.

\* cited by examiner

DIFFUSIVE REFLECTOR FOR A LIGHTING APPARATUS

FIELD

The present invention relates to a light guide. It relates to a light guide to be used with a light source (e.g. one or more LEDs) for illumination purposes. More particularly, it relates to a light guide including a light guiding part which does not require the patterning of light extraction features in the structure of the light guiding part. The light guide may be used in a lighting panel for illumination of rooms and spaces, for backlighting of screens e.g. display screens such as LCD screens. Such lighting panels (e.g. LED lamps) may be used in machines, utility lamps, for video games, festival lights, flash lights, spot lights etc.

BACKGROUND

The current method for implementing light guides for lighting panels is to provide a transparent light guiding panel (e.g. of plastic, such as Acrylic) and to form a pattern of light extraction features at an external surface of that panel. An example is schematically shown in FIG. 1A and FIG. 2. Light guided within the panel by total internal reflection (TIR) is transmitted out of the panel when it impinges upon such a surface feature internally. The extracted light is then used for illumination as desired.

The surface patterning is either machined into or printed (e.g. screen printed) onto the surface of the light guiding panel, or alternatively the light guiding panel is integrally formed with the light extraction features directly by injection moulding.

FIG. 1B illustrates a view of a lighting panel unit according to FIG. 1A in disassembled form, showing the component parts of: a frame for holding the component parts and a frame cover; multiple LED strips containing LEDs for illuminating edges of the light guiding panel; a light guiding panel (with laser machined extraction features in its surface); a back reflector sheet; and, a diffuser. Light from one or more linear arrays/strips of multiple LEDs is injected into the slab at its edge from a single, multiple or all sides through simple butt coupling. A reflector sheet is placed at a back surface of light guiding panel. This reflects the light which has been transmitted out of the light guiding panel through its rear surface, back towards the front surface of the panel. A diffuser is placed at the front surface of the light guiding panel to receive the back-reflected light. It diffuses the transmitted light to create a substantially uniform illumination at the front surface of the panel.

Generally the light injected into the light guiding panel is guided inside the panel by total internal reflection between both opposing inner surfaces of the panel, provided that they are smooth (see FIG. 2). However, if the reflecting surfaces of the panel are formed so as to be rough, then each time a light ray hits a rough area, it may be partially transmitted out of the panel through that rough area such that some light escapes out of the panel. This arises when the angle subtended by the incident light ray subtends an angle (or incidence) with the local surface normal of the panel, which is less than the critical angle ($\theta_c$) for total internal reflection within the panel. This is made to occur at desired locations along the surface of the light guiding slab by providing the surface with 'light extraction' surface features shaped such that this condition occurs.

The critical angle is defined by Snells law of specular reflection in terms of the refractive index ($n_1$) of the panel material and the refractive index ($n_2$) of the medium in immediate interface with the external surface of the panel adjacent the location of light reflection/transmission internally:

$$\theta_c = \sin^{-1}(n_2/n_1)$$

For generating a bright and uniform light output, such rough areas (known as light extraction features) are selectively created at the surface of the light guide panel (typically a plastic plate) either by machining, screen printing or injection molding. These areas typically range in size from several hundreds of microns to a couple of millimetres and follow a specific design determined by light propagation theories.

Methods available for creating such light extraction features at the surface of an acrylic slab (i.e., laser machining, printing—generally screen printing of white dots or injection moulding) are expensive and serial in nature in the sense that the patterning has to be done one piece at a time. These methods also impose restrictions on how fine the extraction features can be and how closely they can be placed. Finer and closely placed extraction features are necessary for thinner light panels.

The limitation of laser machining is the time required for patterning the large number of features on a light guide and the costs associated with that. Injection moulding requires an expensive moulding tool which is specific to each design and hence needs to be changed every time a new design or size is to be manufactured. Injection moulding also restricts the thickness of the light guides, since thinner light guides break during moulding and de-moulding. Screen printing can be relatively lower in cost, but it has design limitations in terms of the size and distribution of extraction features it can create. The problem common to all of these methods is that the patterning processes add significant costs to the manufacture of a light guiding panel.

The invention aims to address these limitations.

SUMMARY

The inventors have discovered that it is possible to generate an efficient light guiding panel/slab without having to pattern the light guiding panel/slab with light extraction features and thus leading to saving of significant cost of patterning of a light guiding panel. This may also provide an improvement in brightness of light guiding panels/slabs.

In a first aspect, the invention provides a diffusive reflector for a lighting apparatus comprising: a backing part upon a surface of which is disposed an interface part(s) wherein the interface part(s) is at least partially diffusively reflective optically and/or the backing part is diffusively reflective optically; wherein the interface part(s) is formed with a plurality of separate protrusions each adapted for making a separate respective contact interface with a surface of a light guide panel of the lighting apparatus to optically couple the backing part to the light guide panel via the interface part(s); and, wherein the interface part(s) comprises an optically transmissive interface material arranged to form said contact interface such that the interfacial energy thereof is reduced so that air is driven from the contact interface, whereby the critical angle for total internal reflection of light guided by the light guide panel is increased at the contact interface. The light guide panel preferably presents to the diffusive reflector a smooth surface (e.g. optically smooth). While the light guide panel may present a curved surface to the diffusive reflector, it may typically be a flat surface and may be flexible. The interface part(s) may be optically transmissive (e.g. partially or wholly transmissive) and may be disposed on a surface of the backing part which may be optically reflective (e.g. partially or wholly reflective). The backing part may be diffusively reflective optically and/or the interface part(s) may be diffusively transmissive optically. The interface part(s) may be partially diffusively reflective optically (i.e. partially diffusively transmissive as well) or substantially wholly diffusively reflective optically, and the surface of the backing part may be substantially non-reflective optically (e.g. substantially wholly transmissive).

The interface part may comprise a transparent substrate upon which the interface material is mounted/printed or disposed (e.g. for structural support) and a 'free' surface of the interface material may be presented (or made available) for forming a wetting interface with the light guide panel. The transparent substrate of the interface part may be mounted/disposed/arranged upon the backing part (which may or may not be a reflective backing part).

With such a diffusive reflector, it is possible to place (e.g. laminate) a patterned film of an optically transmissive or diffusively reflective (e.g. transparent, or at least partially diffusive) interface material containing micro-structure protrusions, on to the outer surface of a light guide panel/slab to change the internal optical reflection properties of the light guide panel/slab where the protrusions contact it. Thus, the interface material exploits the surface energy parameters of the light guide panel of the lighting apparatus to promote a 'wetting' process which drives air from the interface and forms a surface region at which the light guide panel and the protrusions of interface material are directly optically coupled (with no intervening air gaps). The ratio of the optical refractive index of the two materials forming the interface ([external interface material]/[internal interface material]; $n_2/n_1$) is increased relative to that where there is no such interface because no protrusion of interface material is present and only air is present directly at the surface of the light guide panel. Thus, the wetted surface parts of the light guide panel require a larger critical angle for total internal reflection (TIR) which will be satisfied by fewer of the light rays guided within the light guiding panel in use, than would otherwise be the case, or optionally is satisfied by none of them.

Preferably, the plurality of protrusions are arranged for providing, via said contact interface, a plurality of respective surface regions at which the light guide panel and the protrusions of interface material are directly optically coupled. The collective surface area of these surface regions may be at least 10% (preferably significantly more than 10%) of the surface area of the light guide panel over which the interface part extends, in use, and is preferably at least 25%, or more preferably at least 50% or yet more preferably at least 60%, or at least 75%, or at least 80%, or at least 90% of the surface area of the light guide panel over which the interface part extends, in use. The collective surface area of these surface regions may be between 10% and 95%, or more preferably between 25% and 95%, or yet more preferably between 50% and 95%, or between 25% and 75%, or between 40% and 75%, or between 50% and 75% of the surface area of the light guide panel over which the interface part extends, in use. Preferably, the collective surface area of the surface regions is not more than 95% of the surface area of the light guide panel over which the interface part extends, in use. Of course, the collective surface area of the surface regions is less than 100% of the surface area of the light guide panel over which the interface part extends, in use. The percentage in question may depend upon the size of the panel in question. Protrusions of the plurality of protrusions may be of any desired shape in plan view/area, and some preferred examples include: square; rectangular; circular; elliptical; elongated; or a mixture of a number of these shapes.

The presence of optically diffusive components (such as the interface part(s) or/and the backing part) in the diffusive reflector enables it to return reflected light to the light guide panel in a direction which does not merely cause it to resume a path of TIR within the light guide, but which, instead, permits returned light to be transmitted through the light guide panel by passing through each of the opposing plane surfaces of the light guide panel (i.e. those used for TIR) and through the light guide panel completely. This returned light may thereby be extracted from the light guide panel and used for illumination purposes.

An increase in refractive index ratio ($n_2/n_1$) across the interface at a wetted part of the panel surface area (relative to the non-wetted parts) increases the value of the critical angle for total internal reflection of light within the light guiding panel and, consequently, light rays guided to such wetted interfaces will be less likely to be totally internally reflected within the light guiding panel but will be more likely to be partially transmitted out of the wave guiding panel. This is because by increasing the value of the critical angle for TIR, one reduces the probability/proportion of light a ray which is incident upon the interface area at a random angle of incidence, will satisfy the critical angle/TIR condition.

This probability/proportion may be reduced by constraining the cone angle of the input light injected into the light guide panel by a light source (e.g. LED) when the apparatus is used. This cone angle effectively determines the value of the minimum angle of incidence of light rays guided by specular reflection within the light guiding panel (ignoring internal scattering of light). If this minimum angle is less than the critical angle for TIR, then transmission of light occurs outwardly through the wetted interface.

This output light is diffusively reflected by the diffusive reflector when disposed upon the light guide panel, for directing the transmitted light rays back through the light guiding panel for use in illumination (e.g. via a transmission diffuser).

It is to be noted that no surface treatment (e.g. patterning, roughening) of the surface of the light guiding panel, such as shown in FIG. 1 and FIG. 2, is needed. As a result, one may, for example, simply use a plain and un-patterned light guiding panel or plate (or a slab) of an optically transparent material with substantially smooth surfaces in conjunction with the diffusive reflector. A light source, such as an LED, or a set of LEDs (e.g. the same or similar to those used in existing illumination panels) may be used in the normal way with the light guide panel. It is important to note that the light guide panel or slab is the part to which the light is coupled from a single or multiple light sources, e.g. LEDs. The light guiding panel material may be chemically and optically the same as or similar to that used in existing illumination panels and light guide panels/slabs.

In this way, it becomes possible to provide effective light extraction from the light guide panel without having to go to the difficulty and expense of directly applying extraction features to the physical structure of a surface of the light guide panel. Instead, light extraction features (optically diffusive components optically coupled to the interface material) of the diffusive reflector do this job.

The refractive index of the interface material may be less than the refractive index of the material of the light guide slab. For example, the refractive index of the interface material may be a value which is up to 10% smaller (e.g. between 5% and 10% smaller) than the value of the refractive index of the material of the light guide slab. For example, if the material of the light guide slab is PMMA with a refractive index of about 1.49 then the refractive index of the interface material may be as low as about 1.34. Poly(methyl methacrylate) (PMMA), is also known as 'acrylic' or 'acrylic glass' as well as by the trade names 'Plexiglas'®, 'Acrylite'®, 'Lucite'®, and 'Perspex'® among several others. It is a transparent thermoplastic often used in sheet form as a lightweight or shatter-resistant alternative to glass.

An advantage of using a relatively lower refractive index for the interface material is to increase the angle of refraction of light transmitted into the interface material from the light guide panel into the interface material. The results of this include: (a) a longer optical path (i.e. more 'glancing') of the refracted light ray as it passes through the interface material to the optically backing part, which increases the probability of light diffusion if the interface material is diffusively transmissive; (b) the larger angle of incidence (i.e. more glancing) at which the refracted ray illuminates the facing surface of the backing part, increases the area of that surface which it illuminates thereby increasing the probability of light diffusion if the surface is diffusively refractive.

In alternative embodiments, the refractive index of the interface material may be greater than the refractive index of the material of the light guide slab (e.g. at least 10% greater). An advantage of using a relatively higher refractive index for the interface material is to remove the possibility of any TIR occurring at the interface between the light guide panel and the interface material. This means that all light rays internally incident at that interface, within the light guide panel, will transmit at least some proportion of their light through the interface and into the interface material from the light guide panel into the interface material. This can serve to enhance the coupling of light from the light guide panel to the diffusive reflector, but comes at the expense of a smaller, less glancing angle of refraction into the interface material towards the backing surface.

The interface part(s) may be substantially optically non-diffusive. The surface of the backing part may be diffusively optically reflective.

The surface of the backing part may be optically rough, and/or may be patterned or textured thereby providing a diffusively reflective surface. The surface of the backing part may comprise a coating of an optically transparent matrix material containing a dispersion of optically scattering inclusions thereby rendering the surface diffusively reflective.

The interface part(s) may be diffusively transmissive. The surface of the backing part may be a substantially non-diffusive specular reflector or may be diffusively reflective. The backing part may comprise a metallic film or sheet, a mirrored film or sheet, or a multi-layered dielectric reflector such as is readily available to the skilled person in the art. The diffusive reflector may be arranged such that the interface part(s) comprises optically scattering inclusions dispersed within the optically transmissive interface material thereby enabling diffusive scattering of light within the optically transmissive interface material.

The backing part may be a diffusively reflective backing part. The diffusively reflective backing part may comprise a rough surface (e.g. 'optically' rough at spatial scales greater than the wavelength of light). Such a reflective surface may be provided by the surface of a white paint or a powder-based coating applied to a substrate of the reflective backing part. A powder-based coating may comprise a dispersion of powers (e.g. pigment, $TiO_2$, $BaSO_4$ or $Al_2O_3$ or a mixture thereof: typically white) in a suitable organic binder (such as an epoxy or acrylic binders). Alternatively, a physically roughened, textured or patterned reflective surface may be used. Such particulate dispersions may be coated onto a substrate by standard methods of coatings and can be dried thermally or using UV light. Particle sizes (e.g. mean diameter) in such a dispersion (e.g. pigment) within a coating may be less than a micron or may be up to several 100 microns (e.g. 0.5 microns<[mean diameter]<300 microns). Such a diffusive reflector may be arranged to preferably provide a reflectivity of between 90% to 98%. Suitable diffusive reflectors are commercially available from: Brightview Technologies, with an address at: 4022 Stirrup Creek Drive #301, Durham, N.C. 27703, USA; or from Yongtek, with an address at: 12F, No. 86-2, Yiwen 1st St., Taoyuan Dist., Taoyuan City 33045, Taiwan; or from Aojia Optical Chaozhou Xinde Packing Materials, China; or from Shenzhen Tospon LED Lighting Co. Ltd, with an address at: 5F, Building 31, Taoyuan industrial park, Huangtian, Xixiang, Baoan, Shenzhen, China.

Reflective particles/pigments may be directly dispersed in the interface material (wetting material) which is subsequently applied to the backing part to form the plurality of protrusions described above. In this case the interface part becomes diffusively reflective, whereby the light from within the light guide panel which falls on a wetted area provided by a protrusion, will soon be scattered and reflected by the particulates/pigments in that area, if not also by the backing part if the backing part is reflective. Conversely, the light that falls on a region of the light guide panel surface which is not wetted (e.g. air gap/void is present) will undergo continued TIR within the panel.

Preferably, the surface energy of the light guide panel surface is higher than the surface energy of the interface material. The atoms/molecules of a solid are held together by interaction forces. Inside of such a material, the interaction forces on an atom/molecule equilibrate each other. At the interface forces from outside are missing, or significantly weaker, which results in a net force directed into the solid. In order to bring an atom/molecule to the interface, work has to be done against this force. This work is stored in the atom/molecule as potential energy. Hence, an increase of the interface by $\Delta A$ requires an energy $\Delta W_{int}$. The free interfacial energy is defined as the ratio $\Delta W_{int}/\Delta A$.

Surface energy influences wetting phenomena. For example, placing a drop of liquid on a solid substrate may change the surface energy of the substrate. In such a case, the substrate is said to be 'wetting'. As is well known, it is possible to experimentally determine wetting by observing the contact angle ($\theta$) of the liquid drop upon the substrate in an atmosphere of air, using Young's formula:

$$\gamma_{s-g} = \gamma_{s-l} + \gamma_{l-g} \cos(\theta)$$

Young's formula relates the contact angle to interfacial energy where $\gamma_{s-g}$ is the interfacial energy between the solid/substrate and air (gas) phases, $\gamma_{s-l}$ the interfacial energy between the substrate and the liquid, and $\gamma_{l-g}$ is the interfacial energy between the liquid and gas phases. A contact angle of less than 90 degrees indicates a 'wettable' substrate surface in terms of the liquid in question. This is influenced by the interfacial energy between the substrate and the liquid. The same principle applies to other wetting interface materials, such as 'wet' or 'tacky' materials that may not be flowing or flowable liquids, but which serve to reduce the interfacial surface energy.

Wetting of high and low energy substrates occurs as follows. The surface energy of the solid substrate is determined by the interactions that bind the substrate together. Higher energy substrates are more easily wet than lower energy substrates. More complete wetting will occur if the substrate has a higher surface energy than the liquid, or material performing the wetting.

The optically transmissive interface material of the diffusive reflector may be a tacky material permitting detachment and re-attachment of the diffusive reflector to said surface of the light guide.

The diffusive reflector may be flexible. This flexibility enables easier application of the diffusive reflector to the surface of the light guide panel. The backing part may comprise a flexible sheet of material (e.g. reflective material, or transparent material). The interface material may be a non-solid material which is non-flowable or non-flowing upon the surface of the backing part. It may be flexible, malleable and/or ductile. The interface material may be compliant, or deformable (e.g. plastically or elastically), or malleable, printable, flowable, or spreadable to permit it to be applied to the surface of the substrate of the transmission sheet by a printing process.

In a second aspect, the invention may provide a light guide apparatus comprising: a light guide panel comprising a panel surface; a diffusive reflector including a backing part upon a surface of which is disposed an interface part(s) wherein the interface part(s) is at least partially diffusively reflective optically and/or the backing part is diffusively reflective optically; and; wherein the interface part(s) is formed with a plurality of separate protrusions which each make a separate respective contact interface with an area of the panel surface adapted such that the interfacial energy thereof is reduced so that air is driven from the interface, whereby the critical angle for total internal reflection of light guided by the light guide panel is increased at said interface to optically couple the backing part to the light guide via the interface part(s). The diffusive reflector may preferably be according to the first aspect of the invention described above.

Preferably, the plurality of protrusions provide, via said contact interface, a plurality of respective surface regions at which the light guide panel and the protrusions of interface material are directly optically coupled. The collective surface area of these surface regions may be at least 10% (preferably significantly more than 10%) of the surface area of the light guide panel over which the interface part extends, in use, and is preferably at least 25%, or more preferably at least 50% or yet more preferably at least 60%, or at least 75%, or at least 80%, or at least 90% of the surface area of the light guide panel over which the interface part extends, in use. The collective surface area of these surface regions may be between 10% and 95%, or more preferably between 25% and 95%, or yet more preferably between 50% and 95%, or between 25% and 75%, or between 40% and 75%, or between 50% and 75% of the surface area of the light guide panel over which the interface part extends. Preferably, the collective surface area of the surface regions is not more than 95% of the surface area of the light guide panel over which the interface part extends, in use. Of course, the collective surface area of the surface regions is less than 100% of the surface area of the light guide panel over which the interface part extends. The percentage in question may depend upon the size of the panel in question. Protrusions of the plurality of protrusions may be of any desired shape in plan view/area, and some preferred examples include: square; rectangular; circular; elliptical; elongated; or a mixture of a number of these shapes.

In the light guide apparatus, the interface part(s) may be substantially optically non-diffusive and comprise an optically transmissive interface material. The surface of the optically backing part may be diffusively reflective.

In the light guide apparatus, the surface of the backing part may be optically rough, and/or is patterned or textured thereby providing a diffusively reflective surface. The surface of the backing part may comprise a coating of an optically transparent matrix material containing a dispersion of optically scattering inclusions thereby rendering the surface diffusively reflective.

The interface part(s) of the light guide apparatus may be diffusively transmissive. In the light guide apparatus, the surface of the backing part may be a substantially non-diffusive specular reflector or may be diffusively reflective.

The interface part(s) may comprise optically scattering inclusions dispersed within the optically transmissive interface material thereby enabling diffusive scattering of light within the optically transmissive interface material.

The optically transmissive interface material of the light guide apparatus may be a tacky material permitting detachment and re-attachment of the diffusive reflector to the surface of the light guide. The interface material may be an adhesive, arranged to adhere to the surface of the light guide.

In the light guide apparatus, the diffusive reflector is may be flexible.

Preferably, the surface energy of the panel surface of the light guide apparatus, is higher than the surface energy of the interface material.

The light guide panel is preferably made of an optically transparent material with low optical propagation losses. The light guide panel may be colourless, or can be coloured. The materials used for the light guide panel may comprise one or more types of polymers which are substantially optically transparent, or may comprise a crystalline material or a glass material of any composition. Typical examples of a polymeric material are PMMA [Poly(methyl methacrylate)] and its copolymers, a transparent thermoplastic often used as a glass substitute), a polycarbonate, or Polyethylene terephthalate (PET) or other substantially optically transparent polymers. The examples of glassy light guide panel materials are: soda-lime glass or window glass, boro-silicate or silica glass. The light guide panel may be of any shape (typically: square, rectangular or circular) and may have a uniform thickness or may have a variable thickness (such as a wedge shape).

Desirably, the diffusive reflector is flexible, deformable, or similarly malleable to allow it to be applied to the surface of the light guiding panel mechanically or manually. The interface material may be compliant, or deformable (e.g. plastically or elastically), or malleable, printable, flowable, or spreadable to permit it to be applied to the surface of the substrate of the transmission sheet by a printing process. As a result, a quantity of diffusive reflector may be manufactured in sheet form independently of the light guide apparatus, and that quantity (or a part of it 'cut to shape') may be subsequently applied to the light guide panel in a process of manufacturing the apparatus, as discussed in more detail herein.

The diffusive reflector part may be provided as a sheet disposed in contact with the light guide panel. The diffusive reflector part may be arranged to reflect light extracted from the light guide panel in a direction back through the light guide panel for use in illumination. The diffusive reflector part may include a diffusive reflector backing sheet formed from a substrate of PET with a white reflective coating or other multilayered reflectors. A suitable example of a multi-layer reflector is such as the 'Vikuiti™ Enhanced Specular Reflector—ESR' produced by 3M Optical Systems at Optical Systems Division, 3M Center, Building 235-1E-54, St. Paul, Minn. 55144-1000, USA.

The apparatus may include a light source arranged to inject light into the light guiding panel via one or more edges thereof, for guiding thereby. One or more LEDs may be used as the/each light source. The LEDs used may be discrete or collectively mounted on a flexible strip of metal or plastic and the whole assembly may be placed in an appropriate enclosure adapted to place the LEDs in the desired position at an edge of the light guiding panel. One may alternatively also use a diffuser for improved uniformity and optionally an optical film for controlling the output beam profile (i.e., for collimation or spreading light out). The LEDs may be any color or color temperature and could be packaged in any number of ways. The inventors have found that a light panel including a light guiding apparatus according to embodiments of the invention gives a large amount of illumination (high efficiency) with less variation in brightness (high uniformity), and is capable of emitting a plurality of colored lights depending upon the color of LEDs or the light guide panel used.

The interface material on the backing part (e.g. sheet) may be a coating of an organic material. The surface of the backing part may be a diffuse reflector or a specular reflector (i.e., with a mirror like coating). A property of this coating is that it is able to wet the light guide panel/slab when the coated substrate sheet is brought in contact with the light guide panel/slab (e.g. optionally when a contact pressure is applied to the two). This wetting behavior is characterized by the fact that at the spot/location at which a protrusion presented by the coating touches the light guide panel/slab, a wetted area is formed and air is driven out from that area (i.e., there is no air gap between the wetting material and the plate/slab surface). The coating may be adapted to show such wetting behavior spontaneously (as characterized by self-wetting) or it may require application of a certain pressure. This coating of interface material may have adhesive properties such that it forms an adhesive bond while wetting the light guide panel/slab or it may be adapted to not form any permanent or substantial bond with the light guide panel/slab surface, such that the substrate sheet can easily be separated from the light guide panel/slab. The coating of interface material may display such wetting behavior multiple times (e.g. the sheet may be adapted to be removed and re-applied/repositioned multiple times showing a similar wetting behavior each time) or the effect may be seen only once (removing the sheet from the light guide panel/slab diminishes the wetting effect partially or completely).

A suitable interface material may be achieved in several ways. One way to achieve such a coating of interface material can be to synthesize a soft and compliant polymeric or rubbery material. In general many suitable materials with a sufficiently low glass transition temperature (T) may fulfill this requirement. The wetting of a surface can be achieved in several ways. One may use a 'tacky' (e.g. adhesive) material, as described above. One may use a fully cured (dry) compliant material and a wetted area may be created by applying a certain pressure. One may use a self-wetting material in which the wetting takes place spontaneously and it propagates without any pressure. A 'tacky' material will typically form chemical bonds on application of pressure depending upon the chemical groups present in the interface material irrespective of its '$T_g$' value. A compliant material (e.g. compliant at room temperature) typically/preferably has a '$T_g$' value lower than or close to zero degrees Celsius. The surface energy of the compliant interface material can be of the same order of magnitude, or even higher, as that of the surface of the light guide plate. Any surface energy barrier may be overcome by the applied pressure. An advantage of employing an interface material with a lower surface energy and low '$T_g$' value will be the fact that the wetting will take place spontaneously without applying any pressure as in the case of self-wetting. The term 'low' as applied to a $T_g$ value is to be considered in the context that the application (e.g. lamination) of the diffusive reflector to the light guide panel in which wetting takes place at room temperature. For example, a low $T_g$ value may typically mean a $T_g$ value of about 20 degrees Celsius, or less than 20 degrees Celsius or preferably lower than 0 (zero) degrees Celsius (i.e. negative values). Some examples include materials with a $T_g$ value of less than −30 degrees Celsius, or less than −50 degrees Celsius, and of course the invention is not limited to these low $T_g$ values, but may optionally employ them if desired.

Silicone materials are capable of spontaneously wetting (self-wetting) a smooth surface. These materials (silicone or a material comprising silicone) are examples of suitable interface materials. Low surface energy is a factor leading to wetting and self-wetting behavior. Fluorinated materials, poly-urethane materials, acrylic acrylates are further examples of suitable interface materials. They possess suitable surface energy, a low '$T_g$' value, and are soft and compliant materials showing wetting on plastic surfaces.

Alternatively the wetting behavior can also be achieved using interface materials which are still wet or 'tacky' at the time when the diffusive reflector (e.g. a sheet) is brought in contact with the light guiding panel/slab. It is important to note that such 'tacky' interface materials (e.g. a coating) desirably is patterned to provide the aforesaid plurality of separate protrusions as described below. Once a film containing such tacky surface is laminated on a smooth surface of the light guide panel (e.g. a glass, plastic or a crystalline plate), air is driven out and a wet area is created.

The diffusive reflector can be physically placed over the light guide panel and placed in contact therewith to spontaneously wet it. One may also create extraction features in a wet and reactive material (i.e. a monomer or oligomer formulation with a photo-initiator) so that they can be reacted or cured in the interface material after bringing it in contact with the light guide panel thus forming a physical or a chemical bond between the plate and transmission sheet.

The key point is that on places where the coated or patterned transmission sheet touches the light guide panel, there should be a wetting or bonding between the two surfaces and the air trapped between those should substantially be driven out.

The role of refractive index in light coupling efficiency, as discussed above, is that the higher the refractive index of the interface material forming the wetting layer, the higher will be the fraction of light that is coupled out of the light guide panel as compared to that with a lower index of interface material coating the light guide panel, and vice versa. The selection of the refractive index of this coating of interface material may therefore be done, if desired, such that it gives the desired or optimum light out for each light guide in relation to its thickness, and the pattern design for the wetting layer provided by the interface material.

The formulation of the interface material may comprise one or more low $T_g$ monomers or oligomers or a pre-formulated polymers of low $T_g$ monomers. For example, the formulation may comprise between 0% wt to 90% wt of one or more low $T_g$, single functional acrylate (or methacrylate) or vinyl monomer(s). These % values are % wt (i.e. by weight).

There is a range such monomers offering a combination of properties such as low viscosity, high reactivity and good adhesion available from the manufacturers of acrylic materials. Some key examples of such monomers are (but not limited to): Ethyl Acrylate, Ethyl Hexyl Acrylate (EHA), 2(2-ethoxy ethoxy) ethyl acrylate (EOEOA, e.g. item SR 256 from Sartomer with an address at Sartomer Americas, 502 Thomas Jones Way, Exton, Pa. 19341, USA), Phenylthioethyl Acrylate (PTEA), Octadecyl Acrylate (ODA), Isooctyl Acrylate, Phenoxyethyl Acrylate, Isobutyl acrylate, 4-Hydroxybutyl Acrylate, Ethoxylated nonyl phenol acrylate (CD504 from Sartomer), Isotridecyl Acrylate, Lauryl Acrylate, Tetrahydrofurfuryl Acrylate, Ethoxylated Neopentyl Acrylate, 2-Methoxyethyl acrylate, or the corresponding methacrylate.

Optionally formulation of the interface material may comprise from 0% wt to 50% wt of one or more of double or higher functionality, low $T_g$ monomers especially those with long alkyl or ethoxylated chains. This may be in addition to, or part of the formulation described above, e.g. as components of the formulation. Some examples include (but not limited to): Polypropylene Glycol(700) Diacrylate—PPG(700)DA, Polyethylene Glycol(600) Diacrylate—PEG(600)DA, Triethylene Glycol Dimethacrylate—TEGDMA, Ethoxylated(10) Bisphenol-A Dimethacrylate-BPA(10)EODMA, Ethoxylated(6) Trimethylolpropane Triacrylate—TMP(6)EOTA, Ethoxylated(9) Trimethylolpropane Triacrylate—TMP(9)EOTA, Ethoxylated(15) Trimethylolpropane Triacrylate-TMP(15)EOTA, Ethoxylated (20) Trimethylolpropane Triacrylate—TMP(20)EOTA, Ethoxylated(5) Pentaerythritol Tetraacrylate—PPTT, Propoxylated (3) Trimethylolpropane Triacrylate-TMP(3) POTA-T, Bis (EO)20 Phenol A Diacrylate, Bis (EO)30 Phenol A Diacrylate, Nonyl Phenol (EO)8 Acrylate, Trimethylolpropane [3 PO] triacrylate—TMP3POTA, Acrylate ester-SR9045 from Sartomer, or the corresponding methacrylates.

The formulation of the interface material may comprise from 0% wt to 100% wt of a low $T_g$ oligomers. A range of such oligomers are available from various chemical manufacturers. These offer an excellent combination of low $T_g$ with high viscosity, good mechanical and optical properties as well as low yellowing. Examples include (though are not limited to): Aliphatic Urethane Diacrylates [such as Ebecryl 230, 270, 8411 and 8296 from Allnex (formerly Cytec) with an address at Frankfurt, The Squaire, Am Flughafen, D 60549 Frankfurt am Main, Germany], Qualicure GU3001Z, GU3010Z, GU3030Z, GU3290M, GU3300W and GU3300Z from Qualipoly Chemicals, with an address at Qualipoly Chemicals No. 2, Yong Gong 5th Rd., Yong An Dist., Kaohsiung City, 82841, Taiwan), Aliphatic monoacrylate oligomer (such as CN 152 from Sartomer), Aromatic Urethane Acrylate (Such as Saromer CN9761 and Ebecryl 4827 from Allnex, formerly Cytec), Polyester Aromatic Urethane Diacrylates (Such as Qualicure GU3701W from Qualipoly Chemicals, Taiwan), Polyether Acrylate (Ebecryl 81 from Allnex, formerly Cytec), Epoxy Acrylate (Ebecryl 3212 from Allnex, formerly Cytec). There also are a range of Urethane Acrylate Oligomers from Sartomer (e.g., Sartomer CN934, CN 962, CN964, CN965, CN966H90, CN972, CN973H85, CN980 and CN9002 or Photomer 6629, 6630, 6576 from/GM Resins with an address at: IGM Resins B.V., Gompenstraat 49, 5145 Waalwijk, The Netherlands). One can also use similar methacrylates where available.

The formulation of the interface material may comprise low T polybutadiene-based acrylates (e.g., Vinyl Containing Polybutadiene, Such as Ricon 134, 142 and 150 from Cray Valley with an address at: Total Cray Valley, Eagleview Corporate Center, 665 Stockton Drive, Suite 100, Exton, Pa. 19341, USA; or Hydroxy-terminated polybutadiene diacrylate such as BAC-45 from Osaka Organic Chemical Industry Ltd with an address at: 5th Floor, Shin Toyama Building, 1-7-20 Azuchi-machi, Chuo-ku, Osaka City 541-0052, Japan).

The formulation of the interface material may also comprise 0% wt to 30% wt of standard UV curable monomers (i.e. with $T_g>0$) or oligomers to the above formulation for improving the mechanical, rheological, adhesion or optical properties of the formulation. These components can have single or multiple functionalities and can be of any of the common types used in the coatings industry. The example of such monomers is Sartomer CN131B, CN704, CN291, CN9200, CN991, 9761A75, CN2208 and CN2295.

In the formulation of the interface material one may also supplement or substitute completely the oligomer fraction by self-formulated oligomers or polymers. Such oligomers or polymers can be synthesised by partial or complete polymerisation of the above low Tg monomers. This can be done either by photo-polymerising the required monomer (or the mixtures of monomers) in the presence of required UV initiators using intense UV light for a brief interval and then flushing the reaction vessel with oxygen to stop the reaction by deactivating the photo-initiators. The degree of polymerisation and the viscosity can be controlled empirically by varying the reaction time. Alternatively, one can mix required monomers with one or more solvents and a thermal initiator, and then react these by heating the reaction vessel while passing nitrogen in the reaction mixture. The stirring and nitrogen can be stopped after a period of time lasting from 2 hrs to 24 hrs. The solvents can then be substituted with monomers by a reflux reaction.

There also is a range of coating additives which may be added to a UV coating formulation for achieving various process benefits. Use of various surfactants (such as Tego Twin 4100 or Tego Wet 270 from Evonik or Additol VXL 4930 from Allnex, formerly Cytec) and Antioxidants (such as Irganox 1010 from Ciba-Geigy Co. with an address at: BASF Metals Ltd, 21st Floor, 110 Bishopsgate, London EC2N 4AY) are some of the examples of such additives well known to a practitioner of UV coatings. Such additives can also be added to our formulation as appropriate. Further the tackiness of the formulation can also be enhanced by using additional Rosin or hydrocarbon type tackifier resins to the above formulations. Examples are—C9 hydrocarbon resin (Norsolene S115 C9 from Cray Valley) or Staybelite Resin-E, Tacolyn 3179 H resin or Foral™ AX-E resins from Eastman Chemical Ltd with an address at: Eastman Chemical Ltd 200 South Wilcox Drive, Kingsport, Tenn. 37660, USA.

Another approach can be use of UV curable silicones for creating a wetting formulation. A range of such silicone acrylates are available from chemical producers such as Sartomer, Allnex (formerly Cytec), Miwon Chemicals Ltd with an address at: 325-1, Seoksu 2-Dong, Manan-Gu, Anyang-Si, Gyonggi-Do, 430-806, South Korea, or Degussa AG with an address at Evonik Industries AG, Rellinghauser Straße 1-11, 45128 Essen, Germany, and others. Examples are—Sartomer CN990, Sartomer CN9800, Sartomer PRO- 21536, Ebecryl 350, Miramer SIP-900, Tego RAD 2300, RAD2400, RAD2500, RAD2600, RAD2700, RC711 and RC902. One or more of these silicones can be mixed with each other or with one or more of the above mentioned low $T_g$ or standard acrylates in presence of appropriate photo-initiators to formulate a coating and UV cured. Silicone acrylate generally has a low refractive index and can therefore be a good way to produce controlled refractive index wetting formulations.

Similarly, it is also well-known to the practitioner that there are a number of fluorinated acrylate or fluorinated vinyl monomers or oligomers available from various chemical producers, which form a compliant and wetting polymer upon polymerisation and generally show a low glass transition temperature ($T_g$). Such fluorinated UV polymerizable acrylates or vinyl precursors can also be used for formulating required coatings in conjunction with appropriate photo- or thermal-initiators. Some of the examples of such fluorinated monomers are—Heptafluorobutyl acrylate, Hexafluorobutyl acrylate, Hexafluoroisopropyl acrylate, Octafluoropentyl acrylate, Pentafluoropropyl acrylate, Perfluorodecyl acrylate, Tetrafluoropropyl acrylate, Dodecafluoroheptyl acrylate, Heneicosafluorododecyl acrylate, Heptadecafluorodecyl acrylate etc., or the corresponding methacrylates. There also are a range of fluorinated oligomers, the examples of which are: Fluorinated acrylate oligomer CN4002 from Sartomer, FluorAlkyl range of products (e.g., FluoAcryl 4298) from Cytonix (with an address as: Cytonix LLC, Suite 130, 8000 Virginia Manor Road, Beltsville, Md. 20705, USA) and Miramer LR2000 and LR6000 from Miwon Chemicals (Korea).

To enable photo-polymerisation of the free radically curing formulation such as the one formulated above in presence of UV light, 1% wt to 10% wt of one or more photo-initiators are also added to the above mixture. The selection of photo-initiators depends upon a number of factors and these are well understood by a practitioner in the science and technology of polymers. Although there are a large number of such photo-initiators available in industry, a limited number of examples are: Acetophenone, Anthraquinone, Anthraquinone-2-sulfonic acid, sodium salt monohydrate, (Benzene) tricarbonylchromium, Benzoin ethyl ether, Benzoin isobutyl ether, Benzoin methyl ether, Benzophenone, Benzophenone/1-Hydroxycyclohexyl phenyl ketone, Benzophenonetetracarboxylic dianhydride, Benzoylbiphenyl, Benzyl-2-(dimethylamino)-4'-morpholinobutyrophenone, Bis(diethylamino)benzophenone, Bis(dimethylamino)benzophenone, Chlorothioxanthen-9-one, (Cumene) cyclopentadienyliron(II) hexafluorophosphate, Diethoxyacetophenone, Dihydroxybenzophenone, Dimethoxy-2-phenylacetophenone, (Dimethylamino)benzophenone, Dimethylbenzil, Dimethylbenzophenone, Diphenyl(2,4,6-trimethylbenzoyl) phosphine oxide/2-Hydroxy-2-methylpropiophenone, Ethoxyacetophenone, Hydroxyacetophenone, Hydroxyacetophenone, Hydroxybenzophenone, Hydroxycyclohexyl phenyl ketone, Hydroxy-2-methylpropiophenone, Methylbenzophenone, Methylbenzophenone, Methybenzoylformate, Methyl-4'-(methylthio)-2-morpholinopropiophenone, Phenanthrenequinone, Phenoxyacetophenone, Thioxanthen-9-one, These photo-initiators are commonly sold under various trade names such as Irgacure 184, 651, 819, 907, 1173, 2959 from Ciba-Geigy Co. or Esacure KIP100F from Lamberti, with an address at: Lamberti USA Inc., Eight Tower Bridge, Suite 1000-161 Washington Street, 19428 Conshohocken, Pa., USA.

The formulation precursors cited above are free radical curable precursors. However, it is well-known to an expert practitioner of polymer chemistry that UV curing can also be achieved using cationic polymerisation. In general, free radical polymerisation is instantaneous and therefore can achieve fast film throughputs but it has higher sensitivity to oxygen inhibition. However, oxygen inhibition is generally not an issue in applications of the present invention involving UV embossing, since the diffusive reflector film of preferred embodiments may be wrapped around a drum while undergoing UV curing. Free radical polymerisation is a preferred option in terms of speed of cure. Cationic cure can offer advantage in terms of widening the choice of materials with wider set of properties. Most cationic UV resin formulations are cycloaliphatic epoxy based as the epoxide group on these molecules tends to be the most reactive compared when to linear aliphatic or aromatic epoxy molecules. A limited number of examples of Cationic curing initiators are: Iodonium and sulfonium salts, ketone/amine, phosphine oxides, benzoyl germanes, alkyl halides, bis triaryl sulfonium salts, aryl iodonium Salts, dialkyl and cycloalkyl sulfonium salts, phenylethynyl sulfonium salts, acylsulfonium salts, thianthrenium salts, onium salts, anilinium salts, phosphonium salts and thiopyrilium and thiazolinium salts.

Although, photo-polymerisation is the most practical method for creating a patterned layer for the current application, one can also produce such patterns using corresponding moulds and one or more thermal initiators or by using a combination of photo- and thermo-initiators to utilise the availability of both UV and thermal energies. A limited number of examples of such thermal initiators (but by no means limited to) are: 2,2'-Azobisisobutyronitrile, Benzoyl peroxide, 5 tert-Butyl hydroperoxide Benzene, tert-Butyl peracetate Benzene, tert-Butyl peroxide, tert-Amyl peroxybenzoate, tert-Butyl peroxide and tert-Butyl peroxybenzoate.

In a third aspect, the invention may provide a method of manufacturing a diffusive reflector for a lighting apparatus comprising: providing a backing part; providing an interface material; wherein the interface part(s) is at least partially diffusively reflective optically and/or the backing part is diffusively reflective optically; disposing a quantity of the interface material upon a surface of the backing part, and therewith; forming a plurality of separate protrusions of the interface material each adapted for making a separate respective contact interface with a surface of a light guide panel of the lighting apparatus to optically couple the backing part to the light guide panel via the contact interface; wherein the interface material is arranged to form said contact interface such that the interfacial energy thereof is reduced so that air is driven from the contact interface, whereby the critical angle for total internal reflection of light guided by the light guide panel is increased at said contact interface.

The interface part(s) may be optically transmissive, and the method may include disposing the interface part(s) on a surface of the backing part which is optically reflective, wherein the reflective backing part is diffusively reflective and/or the interface part(s) is diffusively transmissive. The interface part(s) may be substantially wholly diffusively reflective and the surface of the backing part may be substantially non-reflective.

An a fourth aspect, the invention provides a method of manufacturing a light guide apparatus comprising: providing a light guide panel comprising a panel surface; providing a diffusive reflector according to the method described above; and; with the plurality of separate protrusions making a plurality of separate respective contact interfaces with an area of the panel surface such that the interfacial energy thereof is reduced so that air is driven from the interface, whereby the critical angle for total internal reflection of light guided by the light guide panel is increased at said contact interfaces to optically couple the diffusive reflector to the light guide via the contact interfaces.

The plurality of separate protrusions formed on the surface of the interface material, in any aspect of the invention, may be formed by a process of 'patterning'. The purpose of the patterning is to enable the making a plurality of separate contact interfaces with an area of the light guide panel surface wherein neighbouring contact interfaces are separated by a region void of any such contact interface in which the interface material does not contact the panel surface to make such a contact interface. This void may be provided by recessed surface areas of the interface material located between protrusions, which are held in separation from the facing surface of the light guide panel by neighbouring protrusions of interface material. This effectively partitions/divides the surface of the interface material in to two types of surface parts, which are: (1) those protruding from the interface material as a result of the plurality of protrusions, and (2) the other parts of the surface of the interface material, between protrusions.

The purpose of patterning is, therefore, to form this partition or division of the surface area of the interface material upon the backing part, into areas where the interface material is able to wet the light guide panel and areas where it cannot reach the panel surface to perform wetting. Such patterning is desirable for enabling a substantially uniform spatial distribution of output light output intensity across the output surface of the light guide panel, in use. Generation of a light guide panel with a substantially spatially uniform light output across its surface also requires a spatial gradient in the light extraction features (e.g. spatial variation in the surface area of the interface material occupied by protrusions) arranged across that surface e.g. from the edges and corners of the surface to its center. This graded pattern ensures that the light that comes out of light guiding panel is uniform, despite of the fact that the light available inside the panel decreases as one moves away from the input light source (e.g. LEDs) as a part of it has already been extracted.

The spatial gradient of extraction features can either be in terms of their area (i.e., varying the protrusion/spot size varies, while the spacing between them remains the same), or varying the spacing (keeping the size same, while the spacing varies) or generally both. The patterning of the interface material permits that the light extracted from the wet areas varies from edge to center such that, desirably, the overall light output is substantially spatially uniform across the surface area of the illumination output surface of the light guide panel, this being the panel surface opposing the one with which the diffusive reflector is in contact. Such patterning designs may be created using optical non-sequential ray tracing simulations, such as using optical design programs well known in the art (e.g. products known as Zemax, Tracepro, ASAP or Lighttools). Such patterns can be specific to the size of the luminaire one requires or these can be more generic such that one can cut areas of different sizes from a sheet of the diffusive reflector according to the invention.

Practical methods of transferring the designed pattern of protrusions of interface material on the backing part of the invention, as described above, may comprise use of a master tool. The master tool may consist of the 'negative' form of the pattern desired for the interface material formed in the surface of a mould/stamper for a coating/printing/embossing machine. Replication of these patterns on films can be done in many ways. For example, repeated use of the mould/stamper permits replication. UV patterning using gravure coating following by UV embossing (also known as UV cast cure) is a suitable method. However, such features can also be created by a number of other methods commonly known for creating patterns in industry (e.g., Flexo, Lithography, ink jet printing, screen printing and any combination or variations of these).

Most preferably, the topmost surface of each protrusion of the plurality of protrusions, from the surface of the interface material forming the patterned area, is preferably substantially flat and smooth (without substantial peaks and troughs) to ensure that the whole protrusion spot area wets the light guide plate surface.

Although, UV embossing is the preferred route for creating ultra-fine patterns with high fidelity, such pattern can also be created by thermal or hot embossing. The above described wetting material can be pressed by a hot master or mould tool at high temperature, thus creating permanent indentations on selective areas, similar in effect to the UV embossed pattern of areas those will come in contact with the light guide plate and those will not.

The effect can also be created by using a uniform, un-patterned layer of the interface material and then creating a fully dried or cured areas at the top by printing so that the wetting and non-wetting areas can be created when the coating is brought in contact with the light guide plate. This can be achieved by selectively applying an ink which gets dried or cured (e.g., by flexo, gravure, litho, inkjet or screen printing), by simply squeezing selected areas of interface material with pressure at normal or elevated temperature or by damaging or ablating the wettable interface material selectively by a mechanical device or a laser. Alternatively, indentations can also be pressed in the backing part (e.g. sheet) and a coating of the interface material is applied to the indented backing part such that the surface of the coating follows the indentations in the backing part and thereby creates raised or depressed areas in that upper surface of interface material. This results in spatially patterned/selective wetting on bringing the diffusive reflector in to contact with the light guide plate. The pattern of protrusions of interface material can also be created by printing non-wetting materials on to the surface of the light guide panel and the backing part/sheet coated with the interface material (wetting) may then be laminated on to the patterned surface of the light guide panel to form air-free wetting areas between the two. The physical act of pressing the diffusive reflector against the light guide panel surface, to fill the free surface areas of the patterned panel surface, causes the malleable interface material to mould/form around the non-wetting material and form said plurality of protrusions of interface material in so doing. Patterning of the interface material is a more practical way of achieving the end product.

An advantage the current invention offers is that a diffusive reflector may be manufactured as a film at high throughput and speeds using commonly available web/film handling machinery at one location (speeds from a few Ft/min (i.e. about 0.1 m/s) up to 100s of Ft/min (i.e. about 1 m/s) are common. As explained above, all current methods of producing light guide plates are slow and require their serialized production, one after another. A roll of film of diffusive reflector, produced as described above, may be shipped to a remote destination where it may be cut to any required size or shape and attached to or laminated on an un-patterned light guide plate of a substantially transparent material. This enables a great saving in shipment and logistic costs as well as providing environmental benefits.

Today, light guide panels are generally made from plastic (preferably acrylic polymers or co-polymers) due to the fact that plastic material can be directly surface-patterned easily by methods such as laser machining or injection molding. Glass would provide significant benefits in terms of fire-retardancy and also cost since float glass is cheaply available. However, there is no economic route to directly surface-pattern glass plates. The current invention enables glass plate light guide panels to be employed, without the need for direct patterning into the physical surface of the glass, thus bring significant benefits for the end user.

The light guide plate with the diffusive reflector attached, according to the invention, can be placed on an enclosure containing LEDs on one, two or all sides. When the LEDs are powered on, the areas of the light guide plate forming an interface with the interface material behave as light extraction features thus coupling light out of the light guide plate to the diffusive reflector where it is diffusively reflected back though the light guide plate and out of its free front surface creating a glow of light at the front surface. A diffuser film or a plate can be placed at the front surface of the light guide plate to further diffuse the output light and makes the light output much more uniform. Alternatively one may place an optical film(s) at the front of diffuser for the purpose of light collimation such as that achieved using known brightness enhancing films.

Another major limitation of the existing methods of patterning a light guide plate (in addition to slow production speeds and significantly high costs) is the fact that these methods can only produce relatively large size features in practical terms. The light extraction features formed in the surfaces of light guides of the current state of the art are predominantly larger than 250 microns in size, and generally around half a millimeter to about 2 mm. The problem with this is that the bright areas (i.e., where the light is being extracted) appear significantly bright as compared to dark areas (where there is no light coming out) surrounding them. The present day light panels therefore require a very thick diffuser (of the order of millimeters thickness) to eliminate the light 'hot spots' for creating a uniform illumination. This thick diffuser adds cost, weight and thickness to the panel, all undesirably.

An advantage of the current invention is that the areas of any one or more of the protrusions of the interface material which wet the light guide plate can, if required, be each be made significantly smaller (e.g. <<250 microns$^2$) and may be areas as small as a few hundreds of nano-meter$^2$ to tens of microns$^2$. The light guide panel optical output thus created therefore appears much more uniform, even without using any diffuser. One can alternatively use a thin film diffuser (e.g. 50 to 250 microns thick) instead of a thick diffuser thus saving thickness, weight and cost of panel. These finer wetting features also enable much thinner (e.g. 500 microns to 2 mm thick) light guide panels.

The light sources (e.g. LEDs) of a lighting apparatus employing the light guide of the invention, may be all of the same type or may be of two or more types. For example, lights of different color/color temperature, different power, different intensity, different style, etc. can be used. In an LED lamp, incorporating the invention, the LEDs may be discrete (e.g. can be controlled individually such that they can be turned on and off or powered individually) or in strip form (with one set of drive conditions).

A panel light incorporating the invention, and without having any direct patterning formed in the light guide surface, has been found to be surprisingly effective. Total lumen output has been found to be up to 12% higher as compared to the state of the art laser machined light-guide of same form factor using the same LEDs. In an aspect of the invention, there is provided a panel light apparatus or a back light apparatus comprising a light guide apparatus as described above.

The diffusive reflector may comprise a protective release liner at the top surface of the patterned interface material. This release liner may be removed immediately before applying the diffusive reflector to the surface of the light guide panel.

In an alternative embodiment of the diffusive reflector, the interface material is disposed upon the backing part and cured. An appropriate pattern is then printed at the top of the cured interface material (wetting layer) using a non-wetting material, using a suitable printing method (preferably a flexo method), and cured. The printed pattern of non-wetting material leaves exposed a pattern of the interface material (wetting) at those parts of the pattern where the non-wetting material is absent. When the film manufactured above is applied/pressed to a flat surface of the light guide panel, the exposed interface material (wetting layer) wets the surface of the light guide layer while the printed area (non-wetting) does not wet it. A pattern of protrusions of wetting interface material is thus formed at the surface of the light guide panel. It is to be understood that the protrusions in this example may be very small elevations in the wetting material, and may be the order of merely nanometers in height/protrusion. This alternative method has been found to be reliable and effective in producing such very small protrusions, when desired.

The diffusive reflector may be mounted/applied, via the backing part thereof, to a film with substantial release properties providing a release liner. This stack is such that when the wetting interface material is applied to a light guide panel surface, the release liner can be peeled off thus leaving a patterned diffusive reflector on the light guide panel surface.

Direct hot embossing of the interface material maybe used to create permanent indentations therein, such that the protrusions of interface material described as above are formed by the regions between such indentations.

The regions located between protrusions of the interface material may comprise voids defining air gaps between the opposing faces of non-wetted light guide panel and either the interface material where present or the backing part if no interface material exists between the protrusions of interface material. The regions located between protrusions of the interface material may be filled with a non wetting material which prevents contact between the interface material and the surface of the light guide panel. The non-wetting material preferably has an index of refraction which is less than that of the material of the light guide panel. The non-wetting material preferably has an index of refraction which is less than that of the interface material.

In a further aspect, the invention provides a diffusive reflector for a lighting apparatus comprising: an optically reflective backing part upon a surface of which is disposed an optically transmissive interface part(s) wherein the reflective backing part is diffusively reflective and/or the interface part(s) is diffusively transmissive; wherein the interface part(s) is formed with a plurality of separate protrusions each adapted for making a separate respective contact interface with a surface of a light guide panel of the lighting apparatus to optically couple the reflective backing part to the light guide panel via the interface part(s); and, wherein the interface part(s) comprises an optically transmissive interface material arranged to form said contact interface such that the interfacial energy thereof is reduced so that air is driven from the contact interface, whereby the critical angle for total internal reflection of light guided by the light guide panel is increased at said contact interface.

In another aspect, the invention provides a light guide apparatus comprising: a light guide panel comprising a panel surface; a diffusive reflector including an optically reflective backing part and an optically transmissive interface part(s) disposed upon a surface of the reflective backing part wherein the reflective backing part is diffusively reflective and/or the interface part(s) is diffusively transmissive; and; wherein the interface part(s) is formed with a plurality of separate protrusions which each make a separate respective contact interface with an area of the panel surface adapted such that the interfacial energy thereof is reduced so that air is driven from the interface, whereby the critical angle for total internal reflection of light guided by the light guide panel is increased at said interface to optically couple the reflective backing part to the light guide via the interface part(s).

In another yet aspect, the invention provides a method of manufacturing a diffusive reflector for a lighting apparatus comprising: providing an optically reflective backing part; providing an optically transmissive interface material; wherein the reflective backing part is diffusively reflective and/or the interface material is diffusively transmissive; disposing a quantity of the interface material upon a surface of the reflective backing part, and therewith; forming a plurality of separate protrusions of the interface material each adapted for making a separate respective contact interface with a surface of a light guide panel of the lighting apparatus to optically couple the reflective backing part to the light guide panel via the contact interface; wherein the interface material is arranged to form said contact interface such that the interfacial energy thereof is reduced so that air is driven from the contact interface, whereby the critical angle for total internal reflection of light guided by the light guide panel is increased at said contact interface.

In a yet further aspect, the invention provides a method of manufacturing a light guide apparatus comprising: providing a light guide panel comprising a panel surface; providing a diffusive reflector according to any aspect described above; and, with said plurality of separate protrusions making a plurality of separate respective contact interfaces with an area of the panel surface such that the interfacial energy thereof is reduced so that air is driven from the interface, whereby the critical angle for total internal reflection of light guided by the light guide panel is increased at said contact interfaces to optically couple the diffusive reflector to the light guide via the contact interfaces.

BRIEF DESCRIPTION OF DRAWINGS

FIG. 4A shows a hypothetical arrangement in which diffusing elements of the invention are removed;

FIG. 4A shows a hypothetical arrangement in which diffusing elements of the invention are removed, while FIG. 4B shows both of two different diffusing elements present and their optical effect;

FIG. 4A shows a hypothetical arrangement in which diffusing elements of the invention are removed, while FIG. 4C shows one of two different diffusing elements present and their optical effect;

DESCRIPTION OF EMBODIMENTS

Figure 1A:
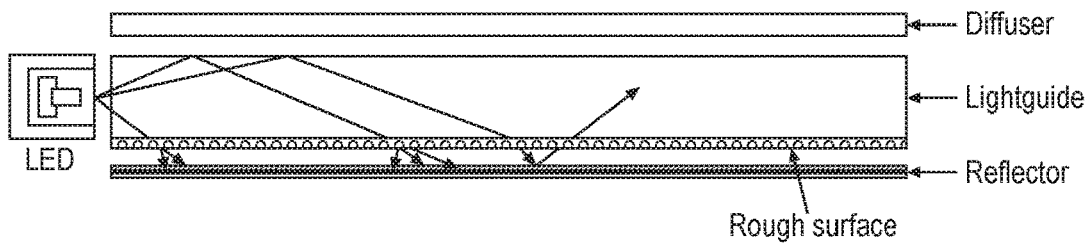
FIG. 1A schematically shows a lighting panel unit according to the prior art.
Figure 1B:
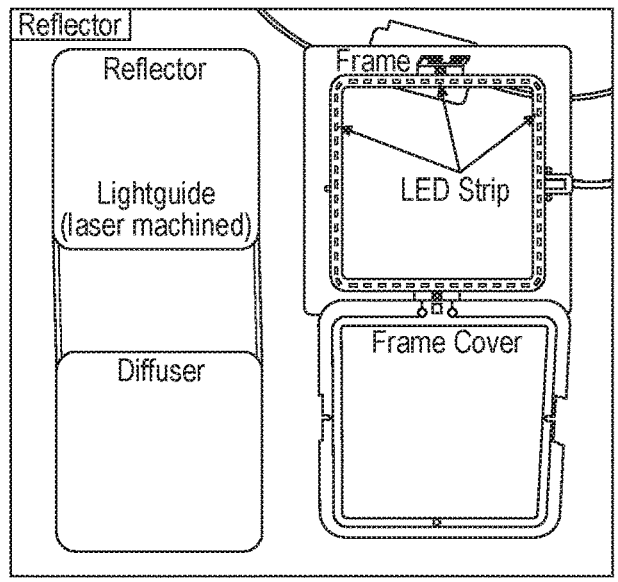
FIG. 1B illustrates a view of a lighting panel unit in disassembled form, showing the component parts of: a frame and frame cover; multiple LED strips; a light guiding panel and a diffuser.
Figure 2:
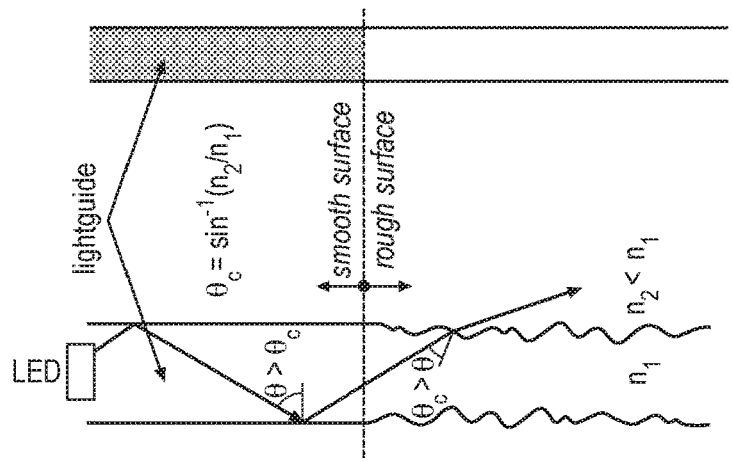
FIG. 2 schematically shows the optical processes of total internal reflection (TIR) in operation within the light guide panel of a lighting panel of FIG. 1.
Figure 3:
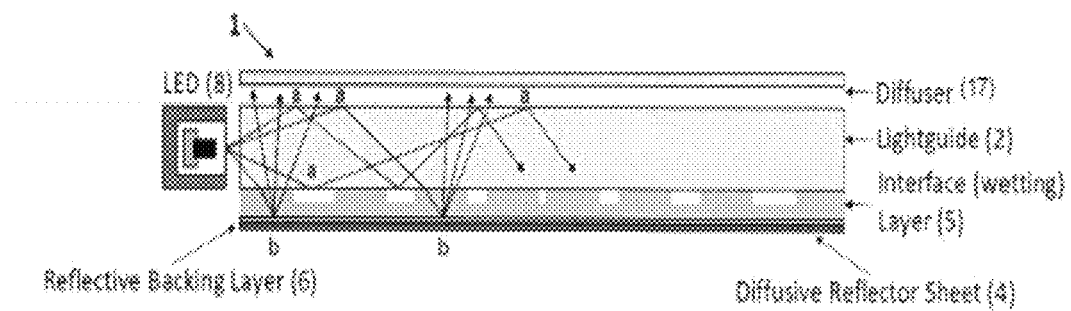
FIG. 3 shows a transmission sheet according to an embodiment of the invention.

An example of an embodiment of the invention is schematically shown in FIG. 3. In particular, FIG. 3 schematically shows a cross-sectional view of a lighting panel comprising a planar light guide panel 2 comprising a rectangular or square flat sheet of optically transparent plastic or glass upon to a rear flat surface of which is laminated a diffusive reflector sheet 4. The diffusive reflector sheet comprises a flexible sheet of reflective backing material 6, such as a diffusive reflector or a specular metallised sheet, or the like, upon a surface of which is disposed a patterned layer of interface material 5. The interface material of the diffusive reflector comprises a surface area in contact with an area of the light guiding panel surface 2. The interface material 5 forms this contact via a wetting interface with the panel surface. The wetting interface is adapted such that the interfacial energy thereof is reduced. Air is driven from the interface. The interface material 5 becomes directly optically coupled to the surface of the light guide panel 2 (with no intervening air gaps). The refractive index of the interface material 5 exceeds that of air such that the critical angle for total internal reflection of light guided by the light guiding panel 2 is increased at the interface. The wetted surface parts of the light guide panel require a larger critical angle for total internal reflection (TIR). In some embodiments, the reflective backing part may be a specular reflector in the form of a metallised sheet, or the like, when used in conjunction with the optically diffusive interface part. In other embodiments, the reflective backing part may be a diffusive reflector, when used in conjunction with either a non-diffusive interface part or in conjunction with an optically diffusive interface part.

The surface area of the light guide panel 2 with which the diffusive reflector sheet makes contact, is substantially smooth and substantially without surface texture or patterning to provide light extraction features. Rather, the regions of interface of the smooth surface with the interface material of the diffusive reflector sheet provide the necessary light extraction features without the need for such surface texturing or patterning. Consequently, light may be extracted from the light guide panel by the diffusive reflector sheet and re-directed (diffusively) through/across the light guide panel in a direction which avoids total internal reflection and allows the light to pass through the upper surface of the light guide panel to an optical diffuser sheet 17 adjacent that of surface.

The surface of the interface material placed in contact with the light guide panel surface presents a plurality of separate protrusions (60, FIG. 4B) of interface material arranged across a pedestal layer (80, FIG. 4B) of the interface material in a predetermined special arrangement or pattern. The uppermost or end surfaces of each protrusion forms a contact interface with the opposing surface of the light guide panel 2, which optically couples the former to the latter. The interface material 5 forms this contact interface via a wetting interface with the panel surface. Protrusions of the plurality of protrusions may be of any desired shape in plan view/area, and some preferred examples include: square; rectangular; circular; elliptical; elongated; or a mixture of a number of these shapes. Recesses in the surface of the interface material disposed between neighbouring protrusions (70, FIG. 4B) define regions where no such contact interface is formed between the interface material and the surface of the light guide panel. These void regions are occupied by air in preferred embodiments, or may be occupied by a non-wetting material (e.g. pre-printed as a pattern onto the surface of the light guide panel) having a refractive index which is significantly lower than the refractive index of both the material of the light guide panel and the interface material.

In operation, light from the LEDs 8 is injected into the light guide panel 2 at its edge from a single, multiple or all edge sides through simple butt coupling. Light rays injected into the light guide panel or reflected (a) between the opposing, parallel inner surfaces of the panel by a process of TIR at both the upper surface (inner) and those parts (a) of the lower surface (inner) which have not formed an interface/contact with the interface material of the diffusive reflector sheet 4. The diffusive reflector sheet 4 is placed at a back surface of light guiding panel. This diffusively reflects the light (b) which has been transmitted out of the light guiding panel 2 through its rear surface, back towards the front surface of the panel. A diffuser 17 is placed at the front surface of the light guiding panel 2 to receive the back-reflected light (b). It diffuses the transmitted light to create a substantially uniform illumination at the front surface of the panel.

Figure 4A:
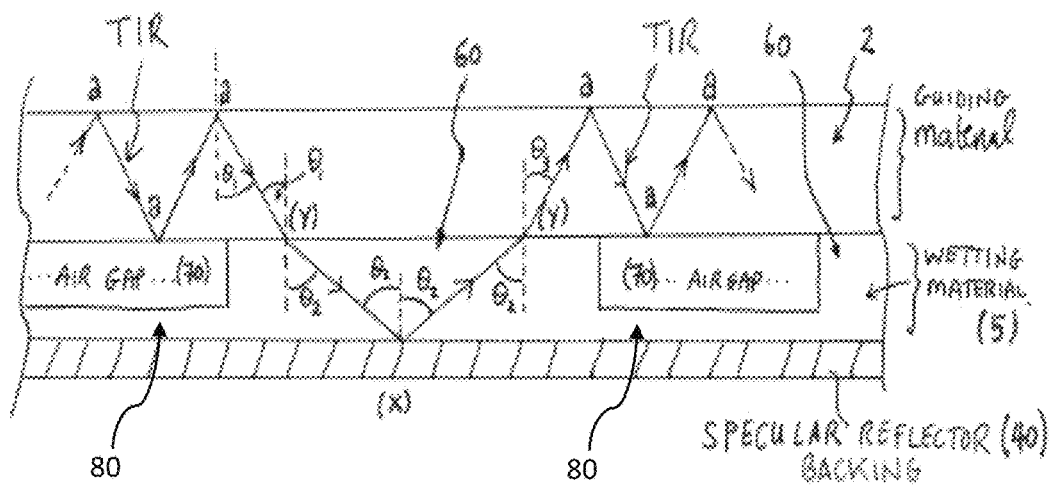
FIG. 4A shows a magnified view of a part of the transmission sheet of FIG. 3 revealing the patterned interface material coated thereon.
Figure 4B:
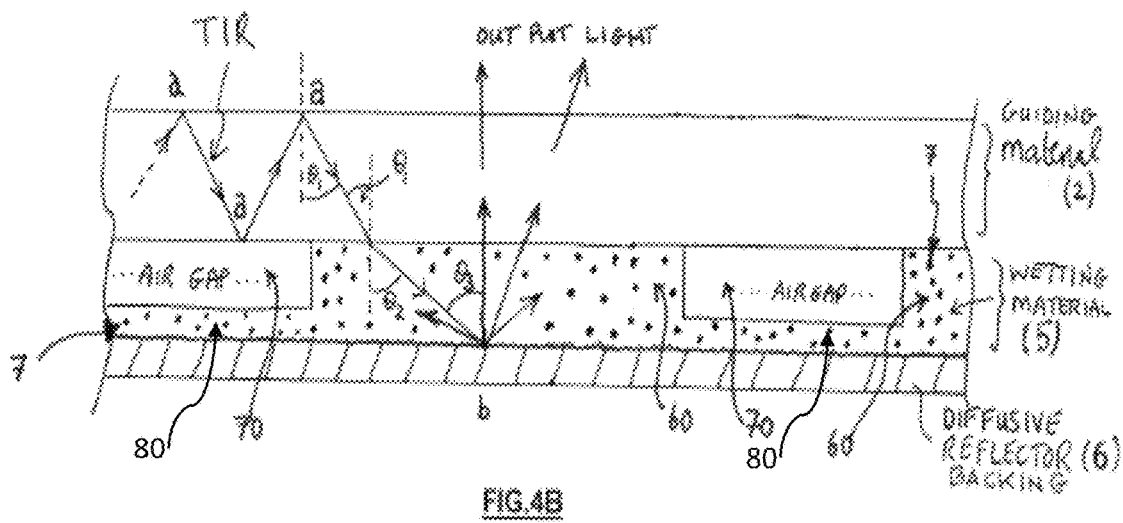
FIG. 4B shows a magnified view of a part of the transmission sheet revealing the patterned interface material coated thereon.

FIGS. 4A and 4B shows a magnified view of a part of the transmission sheet of FIG. 3 which reveals the patterned interface material coated thereon. FIG. 4A shows a hypothetical modified arrangement in which diffusing elements of the invention are removed, while FIG. 4B shows both of two different diffusing elements present and their optical effect. The invention may be implemented by applying any one of, or both of, these two diffusing elements.

Referring to FIG. 4A, there is shown a schematic cross-sectional view of a notional modified form of the diffusive reflector sheet for of FIG. 3, in which the optically diffusive elements have been removed from the reflective backing layer 6 and from within the body of the interface (wetting) layer 5. In this hypothetical scenario, the material of the interface layer is entirely optically transparent and contains no dispersion of any optically scattering particles thereby rendering it substantially non-diffusive. Similarly, the surface of the reflective backing layer 6 upon which the interface material is coated is also simply a smooth specular reflector and bears no surface texturing, patterning or coating which could render it optically diffusive.

The interface material presents a pedestal layer 80 with a plurality of separate protrusions 60 of interface material thereon, with uppermost or end surfaces of each protrusion in contact with the opposing surface of the light guide panel 2. This optically couples the former to the latter. Recesses 70 in the surface of the interface material disposed between neighbouring protrusions define void regions occupied by air. A light ray guided along the light guide panel to between its opposing inner surfaces undergoes TIR at each internal reflection (a) with the upper surface of the light guide panel and at those parts of the lower surface of the light guide panel which are immediately adjacent and airgap 20 at which the light guide panel is not in contact with a protrusion 70 of interface material 5. These internal reflections each occur at an angle of incidence and reflection $\theta_1$.

However, when the light ray strikes the lower internal surface of the light guide panel at a region where a contact interface is made with a protrusion of interface material 60, transmission of light is possible through the interface. The transmitted light ray enters the interface material (location indicated as 'Y' in FIG. 4A) at an angle of refraction $\theta_2$. This angle also defines the angle of specular reflection of the transmitted ray at the specular reflecting surface of the specular reflector backing 40 illustrated in FIG. 4A. The result is that according to Snell's Law:

$$n_1 \sin(\theta_1) = n_2 \sin(\theta_2),$$

which defines the angle of refraction into the interface material 5. Here $n_1$ is the value of the refractive index of the material of the light guide panel 2, and $n_2$ is the value of the refractive index of the interface material 5. Similarly, specular reflection at the specular reflector backing 40 returns the transmitted ray back to the interface between the protrusion of interface material and the lower surface of the light guide panel (location indicated as 'Y' in FIG. 4A) at an angle of incidence at that surface equal to $\theta_2$, whereupon the reflected ray is refracted back into the light guide panel with an angle of refraction which is equal to $\theta_3$. According to Snell's Law:

$$n_2 \sin(\theta_2) = n_1 \sin(\theta_3),$$

and therefore, $$n_1 \sin(\theta_1) = n_1 \sin(\theta_3),$$

which is only true if $\theta_3 = \theta_1$. But since $\theta_1$ is the angle of incidence upon an internal surface of the guide panel at which TIR will occur, the result is that the reflected ray returned by the reflector to the light guide panel will simply resume its onward path of total internal reflection, and the protrusion 60 of interface material 5 is not able to cause that ray of light re-enter the light guide panel at an angle permitting it to transmit through the upper surface of the light guide panel.

This state of affairs is solved by the present invention, by the provision of one or both of the diffusive optical elements (5 &/or 6) being included in the diffusive reflector (4). A first diffusive optical element is the provision of an optically rough, patterned or structured reflective surface or a diffusive coating material being provided on the surface of the backing layer upon which the interface material is coated. A second diffusive optical element is the provision of optically diffusively scattering particles 7 dispersed within the interface/wetting material 5. In the example illustrated in FIG. 4B, both of these two different diffusive optical elements (5, 6) are shown as being provided together, but it is to be understood that in other embodiments of the invention either one of these two diffusive optical elements may be used alone.

Figure 4C:
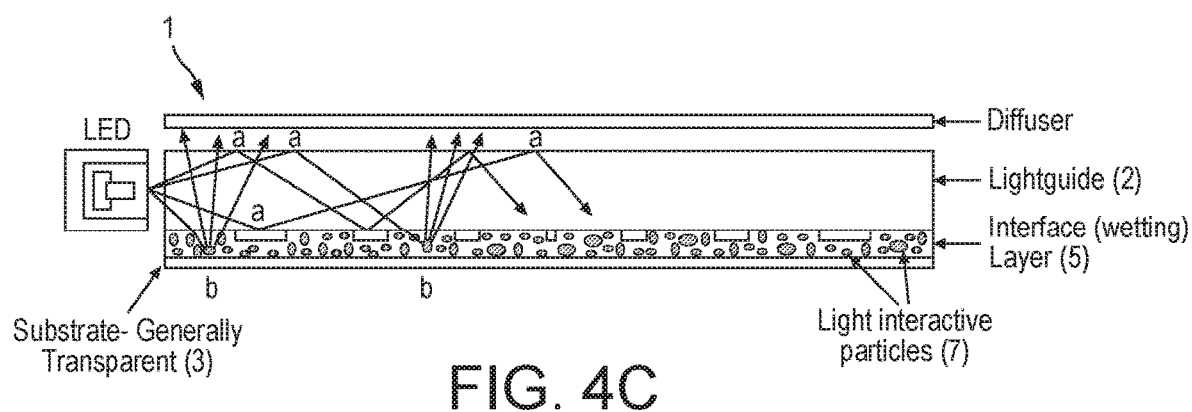
FIG. 4C shows a magnified view of a part of the transmission sheet revealing the patterned interface material coated thereon.

FIG. 4C shows an example in which the backing layer is non-reflective and is substantially optically transparent substrate 3. In this case, the interface part comprises a wetting interface material impregnated with a dispersion of many light scattering/reflecting particles and/or functional light active particles 7 such as quantum dots, phosphors and/or luminophores. The interface part may be partially diffusively transmitting/reflective if the concentration of these particles is chosen to achieve that result, such that the layer purposefully behaves as partially transmissive of light extracted from the light guide part. The result would be to provide an illuminating output from both sides of the overall light panel assembly, as desired, with diffusively reflected light being output via the light guide part, and diffusively transmitted light being output from the transparent backing layer/part. Partial reflectivity can be further controlled by using specific optical films (such as prismatic or pyramid films in reflective configuration) arranged adjacent or across the light-outputting surface of the transparent backing layer, or formed by/within the backing layer itself, so as to control the quantity or proportion light that is to be returned/reflected to the diffusively transmissive interface part, and the quantity or proportion to be transmitted from the back surface of the panel assembly.

By providing a diffusively reflective interface part (wholly reflective or partially reflective) one may achieve greater ease of manufacturing and a reduction of manufacturing cost due to removal of a stand-alone reflector that is otherwise provided by the backing part in other embodiments. The base formulations that may be used for the interface material may remain the same as those discussed in the other embodiments described herein (i.e. those embodiments employing a reflective backing part). However, one or more types of scattering particles are dispersed in those interface materials so that the light out-coupled from the light guide panel is scattered and at least some of it is back-scattered/reflected towards the light guide panel as a result of one or more such events.

The size of the particles, their refractive index and the provision of a uniform dispersion of such particles within the wetting interface material (the binder medium) are important factors in controlling the efficiency of back-scatter. It is known from the state of the art that for the most efficient light scattering, the diameter of a scattering particle should be slightly less than one-half the wavelength of light to be scattered. Since the human eye is most sensitive to yellow-green light (wavelength about 0.55 microns), the theoretical optimum particle size for the interface part is between 0.2 and 0.3 microns in diameter. Also the larger the difference between the refractive index of the scattering particles and that of the interface material in which it is dispersed, the greater the light scattering. Consequently, for example, the Rutile form of $TiO_2$ (which has a higher refractive index than that of the Anatase phase) is much more efficient for scattering light, and is preferably the material used for the particle inclusions within the interface material.

It is also known that as the volume concentration of the scattering particles in the interface material (volume ratio of the particles to total volume of the interface material) increases above a certain value, diffractive light scattering decreases because of particle crowding. Further, a good dispersion of the particles in the interface part is important to avoid agglomeration of the particles. The well-spaced particles of well-controlled size offer the best ability to diffract light and this is an important consideration in the design of this functional coating system.

Particles of two or more different types (in terms of the chemical composition, refractive index and particle sizes) are beneficial to optimise the back-scattering of light. The inventors have found that a favourable combination as follows: One type of particles (e.g., Rutile $TiO_2$) with average diameter in the range of 0.2 to 0.3 microns provide effective scattering, and another type of particles (e.g., $BaSO_4$) with average diameter in the larger size range (typically 1.0 to 2.0 microns) work as suitable spacers for the smaller scattering particles.

As examples (but not limited to these) of the common type of particles those may be used are:

One or more types of inorganic oxide particles such as: $TiO_2$, $Al_2O_3$, ZnO, MgO, $SiO_2$, $ZrO_2$, ZnS, $Hf_2O_3$, Yttrium Oxide, Lanthanum Oxide, Indium Oxide, Lithopone, Aluminosilicate, Yttrium aluminum oxide. Especially useful among this type of particles are $TiO_2$ particles. Such powders are readily available to the skilled person as those provided by the 'Ti-pure' range of powders from Venator Materials PLC. Especially useful among this type of particles also, are $BaSO_4$ (e.g., as available via the 'Blanc Fixe' range from Venator Materials PLC, with an address at 10001 Woodloch Forest Drive, Suite 600, The Woodlands, Tex., USA—77380, or as an opto-polymer powder available from OptoPolymer GmbH with an address at Lilienthalallee 7, D-80807 Munich, Germany).

Other non-oxide or multi-element oxide particles include: Aluminium nitride, Calcium Titanate, Calcium Zirconate, Strontium Titanate.

Polymeric Particles include: Polyamide, acrylic and fluoropolymer particles e.g. such as those readily available to the skilled person from the Arkema company (with an address at Arkema Group, 420 rue d'Estienne d'Orves, 92700 Colombes, France); copolyester/polyamide, methylendiaminomethylether and polymethyl Urea particles e.g. such as those readily available from the Deuteron company; PTFE micro-powders e.g., such as 'Fluorosperse' particles readily available from Sharmock technologies (with an address at Sharmock Technologies Inc., Foot of Pacific Street, Newark, N.J. 07114, USA).

Glass and mineral particles may be used and are readily available to the skilled person.

Additionally, the scattering can be complemented by using one or more type of common matting agents (particles added to pants to provide a 'matte' finish) used in the coatings industry. Typical examples readily available to the skilled person include e.g. the 'Bentone' range of matting agents from the Elementis company (with an address at: Elementis Specialties, Inc., 469 Old Trenton Road, East Windsor, N.J. 08512, USA) and the 'Acematt' range of matting agents from the Evonik company (with an address at Evonik Industries AG, Rellinghauser Straße 1-11, 45128 Essen, Germany).

Particles with special functionalities in addition to the scattering include: Quantum dots, Phosphors, Luminophers, CNTs (Carbon Nano-tubes) and Graphene for tuning colour rendering index as well as for specific spectral output.

The following formulations for the interface material may be used when the interface part is used in conjunction with a transmissive (e.g. transparent) backing part (e.g. FIG. 4C).

Example A

In a first example, the formulation of the interface material comprised: 12 wt % of Sartomer CN 965 (from Arkema, previously—Sartomer), 7 wt. % of Sartomer CN966H90 (Arkema), 20 wt. % of Sartomer CN9002 (Arkema), 8 wt. % of Sartomer SR285 (Arkema) and 27 wt. % Phenylthioethyl Acrylate were mixed together. 3 wt % of photo-initiator Esacure KT046 from Lamberti, 1 wt. % of Tego disperse 652 from Tego, Germany and 1% Additol VXL4930 from Allnex were added to it. Finally, 5 wt. % of a $TiO_2$ powder R 405 (from Sachtleben), 8 wt. % of Barium Sulphate powder Blanc Fixe Micro (from Brentag Germany) and 8 wt % of another $BaSO_4$, Opto-polymer (from Opto-polymer Germany) were also added and dispersed using a dispersing machine (IKA Ultra Turrex Disperser). The resulting formulation was applied on a clear PET film using a roll to roll UV coating machine and patterned as per the pattern designs discussed herein. A transparent patterned layer with spontaneous wetting properties resulted from this, and this layer was laminated on a 4 mm thick clean Acrylic slab. The layer could be applied on such surface and removed multiple times without any loss of tackiness. This resulting slab was then placed in a frame with LEDs on 2 sides. A thin film diffuser was used at the top. When the LEDs were switched on, the panel resulted in a very uniform light much brighter than the commercial laser machined light-guide panel with the same LEDs.

Example B

Using 42 wt. % of Sartomer CN9002 (Arkema, previously Sartomer), 15 wt. % of Sartomer SR256 (Arkema), 10 wt. % of Sartomer SR285 (Arkema) and 15 wt. % Phenylthioethyl Acrylate were mixed together. 0.5 wt. % of Sartomer SR9051 (Arkema) was also added to it for improving adhesion. 4 wt % of Photo-initiator Esacure KT046 from Lamberti, 0.5 wt. % of Tego Disperse 652 (From Tego, Germany) and 1% Additol VXL4930 (from Allnex) were added to it. Finally, 2 wt. % of a $TiO_2$ powder R 405 (from Sachtleben), 3 wt. % of Barium Sulphate powder Blanc Fixe Micro (from Brentag Germany) and 8 wt % of another $BaSO_4$, Opto-polymer (from Opto-polymer Germany) were also added and dispersed using a IKA Ultra Turrex disperser. The resulting formulation was applied on a clear PET film using a roll to roll UV coating machine and patterned as per the pattern designs discussed herein. A transparent patterned layer with spontaneous wetting properties resulted from this, and this was laminated on a 4 mm thick clean Acrylic slab. This resulting slab was then placed in a frame with LEDs on 2 sides. The LED panel resulted in a very uniform light much brighter than the commercial laser machined light-guide panel with the same LEDs.

Example C

Using 19 wt. % of Sartomer CN9002 (Arkema, previously Sartomer), 7 wt. % of Sartomer CN966H90 (Arkema), 7 wt. % of Sartomer SR285 (Arkema), 12 wt. % of Sartomer CN965 (Arkema, previously Sartomer) and 26 wt. % Phenylthioethyl Acrylate were mixed together. 0.5 wt. % of Sartomer SR9051 (Arkema) was also added to it for improving adhesion. 3 wt % of Photo-initiator Esacure KT46 from Lamberti, 1 wt. % of Tego Disperse 652 (From Tego, Germany) and 1 wt. % Additol VXL4930 (from Alinex) were added to it. Finally, 10 wt. % of a $TiO_2$ powder R 405 (from Sachtleben) and 14 wt. % of Barium Sulphate powder Opto-polymer (from Opto-polymer Germany) were also added and dispersed using a IKA Ultra Turrex disperser. The resulting formulation was applied on a clear PET film using a roll to roll UV coating machine and patterned as per the pattern designs discussed herein. A transparent patterned layer with spontaneous wetting properties resulted from this, and this was laminated on a 4 mm thick clean Acrylic slab. This resulting slab was then placed in a frame with LEDs on 2 sides. The LED panel resulted in a very uniform light much brighter than the commercial laser machined light-guide panel with the same LEDs.

Example D

The example below allows the light-guide capable of illuminating both sides (i.e., partially transmitting and partially reflecting).

Using 28 wt. % of Sartomer CN9002 (Arkema, previously Sartomer), 10 wt. % of Sartomer CN966H90 (Arkema), 8 wt. % of Sartomer SR285 (Arkema), 15 wt. % of Sartomer CN965 (Arkema, previously Sartomer) and 20 wt. % Phenylthioethyl Acrylate were mixed together. 0.5 wt. % of Sartomer SR9051 (Arkema) was also added to it for improving adhesion. 3 wt % of Photo-initiator Esacure KT46 from Lamberti, 1 wt. % of Tego Disperse 652 (From Tego, Germany) and 1 wt. % Additol VXL4930 (from Allnex) were added to it. Finally, 14 wt. % of Barium Sulphate powder Opto-polymer (from Opto-polymer Germany) were also added and dispersed using a IKA Ultra Turrex disperser. The resulting formulation was applied on a clear PET film using a roll to roll UV coating machine and patterned as per the pattern designs discussed herein. The resulting transparent patterned layer with spontaneous wetting properties and this was laminated on a 4 mm thick clean Acrylic slab. This resulting slab was then placed in a frame with LEDs on 2 sides. The LED panel resulted in a very bright light panel illuminating the area at the front as well as the back of the light-guide uniformly. In FIGS. 3 and 4B to 4C, the interface layer 5 comprises an upper surface presenting a pattern of protrusions spaced apart by voids, air-gaps or spacings of non-wetting material. These protrusions protrude from an integral 'pedestal layer' which is a continuous layer of the interface material to which the backing layer/part is attached. The pedestal layer is the flat layer below the patterned structures and serves as pedestal to these patterns. The thickness of this pedestal layer, in any embodiment herein, may be in the range 5 to 50 microns. The inventors have found that it is advantageous to employ the pedestal layer in this thickness range (between 5 to 50 microns, preferably between 10 to 25 microns), as it helps in trapping some additional high angle light which would otherwise be lost if the pedestal layer was thinner (or absent) and therefore helps to make the light panel assembly more uniformly illuminated, in use.

The consequence of the provision of diffusive optical elements, as exemplified in FIGS. 3, 4B and 4C for example, is to break the reflection symmetry inherent in the reflection of refracted rays by a specular reflector backing, such as shown in FIG. 4A, which causes the condition $\theta_3=\theta_1$. The act of optical diffusion of a ray of light refracted into the diffusive reflector sheet 4 is to redirect the refracted light back towards the light guide panel 2 in a direction/angle which is, in effect, random ($\theta_3$=random). Amongst this random distribution of directions there will exist a great many directions which permit the redirected light ray to transmit through the light guide panel as output light for use in illumination.

Figure 5:
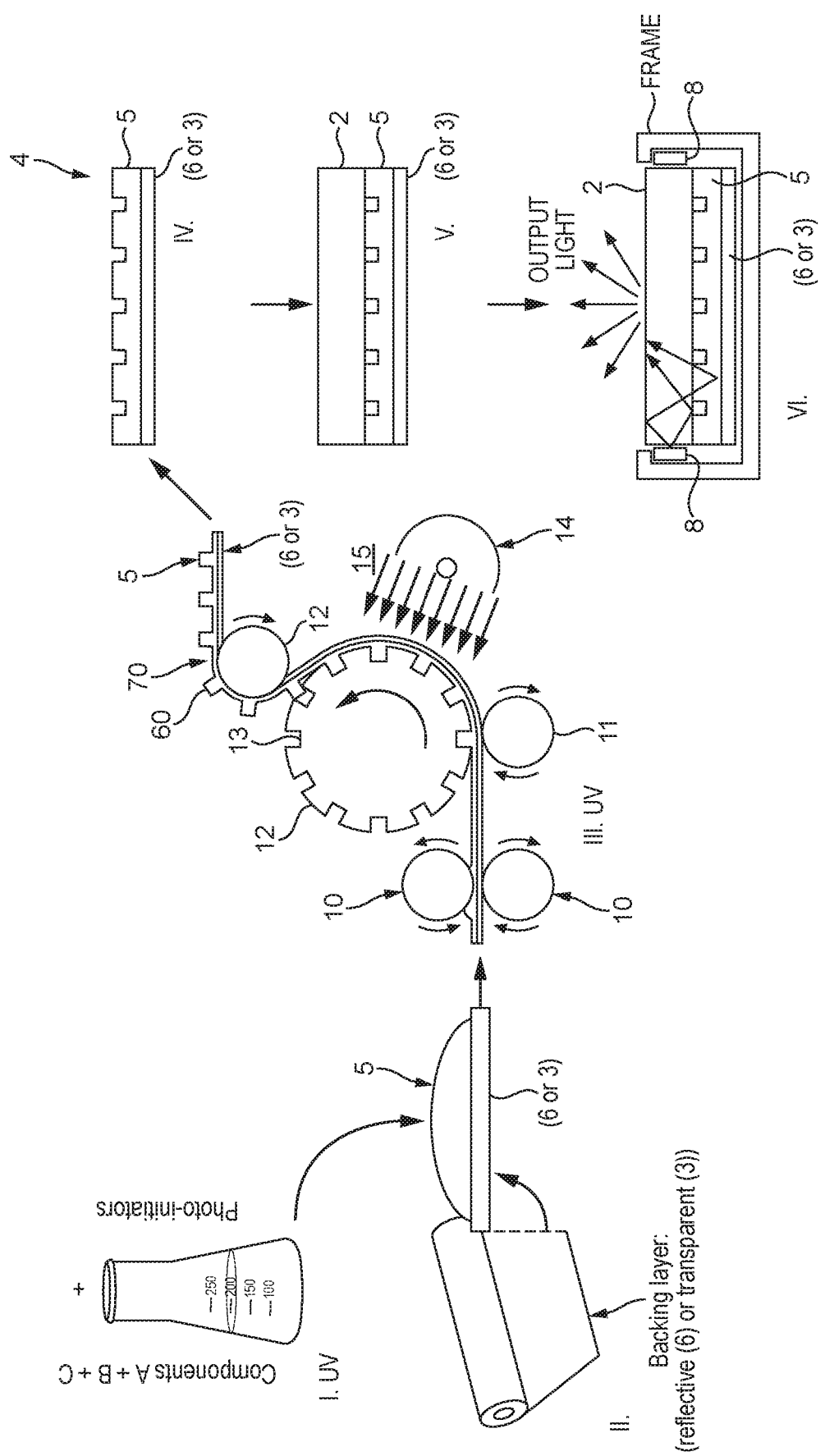
FIG. 5 schematically shows a process of manufacturing a diffusive reflector, a light, and a lighting panel containing the diffusive reflector according to an embodiment of the invention.

FIG. 5 schematically illustrates a process for the manufacture of a diffusive reflector sheet 4 according to the following steps:

STEP I: Provide a composition for an interface material 6 comprising, for example, a mixture of component chemicals such as is described in more detail below, together with a photo initiator substance which is responsive to ultraviolet (UV) light to cure the otherwise mechanically compliant composition. In some embodiments, a dispersion of optically scattering particles may be mixed into the composition.

STEP II: Provide a flexible sheet of backing material 4 which may have a diffusively reflecting surface which is optically rough, patterned or structured, or bears a coating of diffusive material upon its surface. A quantity of the interface material (uncured) is coated onto the surface of the backing material. In some embodiments, the flexible sheet of backing material may simply present a specular reflecting surface, or may be transparent and non-reflective, in which case the quantity of interface material coated upon it must contain the aforementioned dispersion of optically scattering particles. The flexible sheet of backing material may be provided as a continuous web, which may be unrolled from a role of the backing material, and the coating of uncured interface material may be continuously applied to the backing material as it is unrolled.

STEP III: Pass the coated backing material through a printing mechanism comprising: (1) passing the coated backing material between an initial pair of rollers 10 with opposing roller services spaced to admit the coated backing material between them but in so doing to spread the coating of interface material across the surface of the backing material substantially evenly to a substantially uniform thickness; and (2) subsequently passing the coated backing material between an second pair of rollers, 11 and 12, with opposing roller services spaced to admit the coated backing material between them but in so doing to imprint or emboss a predetermined pattern of protrusions, separated by recesses, in the uppermost exposed surface of the coating of interface material. One roller of the second pair of rollers is a printing roller 12 upon the operative surface of which is formed a pattern of recesses 13 which reciprocally mirror the pattern of protrusions embossed into the surface of the printed interface material by the action of the printing roller (i.e. the "negative" of the embossed pattern of protrusions produced in the surface of the interface material 5. During the embossing process, and ultraviolet lamp 14 bathes the interface material with UV radiation 15 while the printing roller 12 engages the interface material. This serves to initiate the photo-initiators included in the composition of the interface material so as to cure the interface material to render the embossed pattern of protrusions permanent.

STEP IV: The embossed interface material 5, and the sheet of backing material for is subsequently separated from the printing roller 12 to reveal the diffusive reflector sheet for replete with interface (wetting) material 5 presenting a pattern of protrusions 60 separated by recesses 70.

STEP V: The flexible diffusive reflector sheet for is manually or mechanically applied to a light guide panel 2 such that a wetting interface is formed between the top surfaces of the protrusions of interface material 5 and the opposing smooth surface of the light guide panel.

Figure 7:
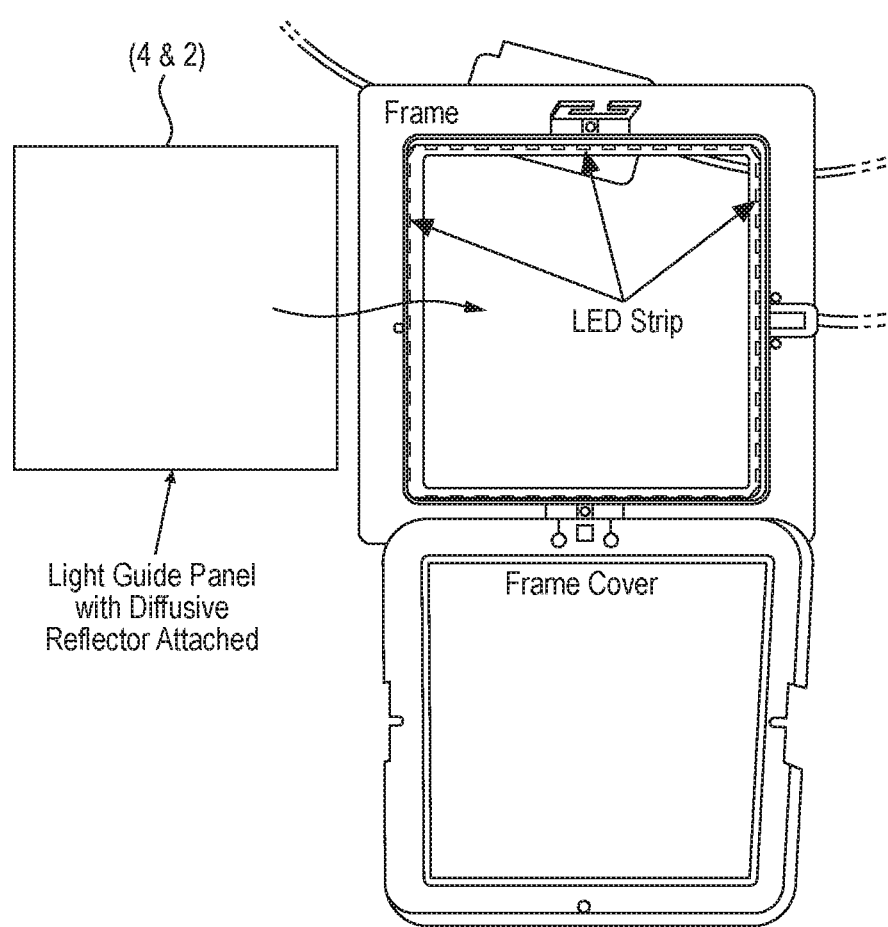
FIG. 7 illustrates a view of a lighting panel unit according to FIG. 3 in disassembled form, showing the component parts of: a frame and frame cover; multiple LED strips; a diffusive back reflector sheet, a light guiding panel.

A process for the manufacture of a panel light apparatus is also illustrated in FIG. 5 and simply comprises providing the light guide panel resulting from STEP V, and mounting that product within the frame of a lighting apparatus containing light sources 8 (e.g. LEDs) such that the light sources are disposed to inject illumination light into the light guide panel for total internal reflection within the light guide, whereby the extraction features provided by the diffusive reflector sheet 4 enabling extraction of the guided light, in use as is schematically shown in STEP VI of FIG. 5. FIG. 7 illustrates a view of a typical lighting panel unit resulting from STEP V, but shown in disassembled form for a better understanding and showing the component parts of: a frame structured and arranged to provide a recess for receiving the light guide panel (with diffusive reflector attached) in register with an aperture in the frame through which the uppermost surface of the light guide panel is presented (when in assembled form); and frame cover to cover the back of the frame and to hold the light guide panel in place; multiple LED strips disposed around the edges of the aperture of the frame for use in injecting light into the light guide panel via its edges. An optical diffuser sheet panel (not shown) may be disposed within the frame at the aperture in a position so as to extend across the uppermost surface of the light guide panel to receive light output from the panel and to defuse that light as it exits the lighting panel unit as illumination light.

Figure 6A:
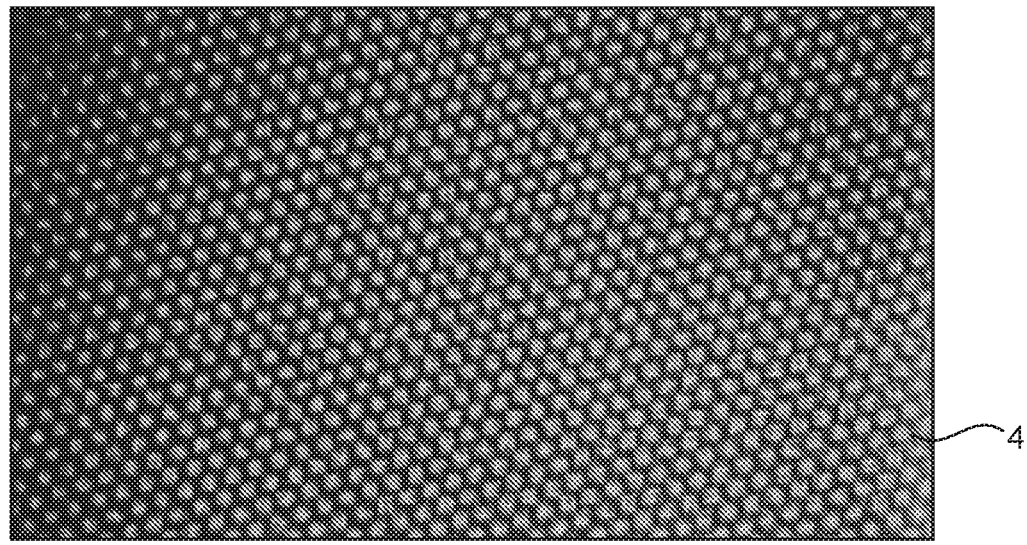
FIGS. 6A and 6B each show a view of a respective example of the diffusive reflector as seen from the patterned surface of the interface material thereof, presenting a pattern of a plurality of protrusions.
Figure 6B:
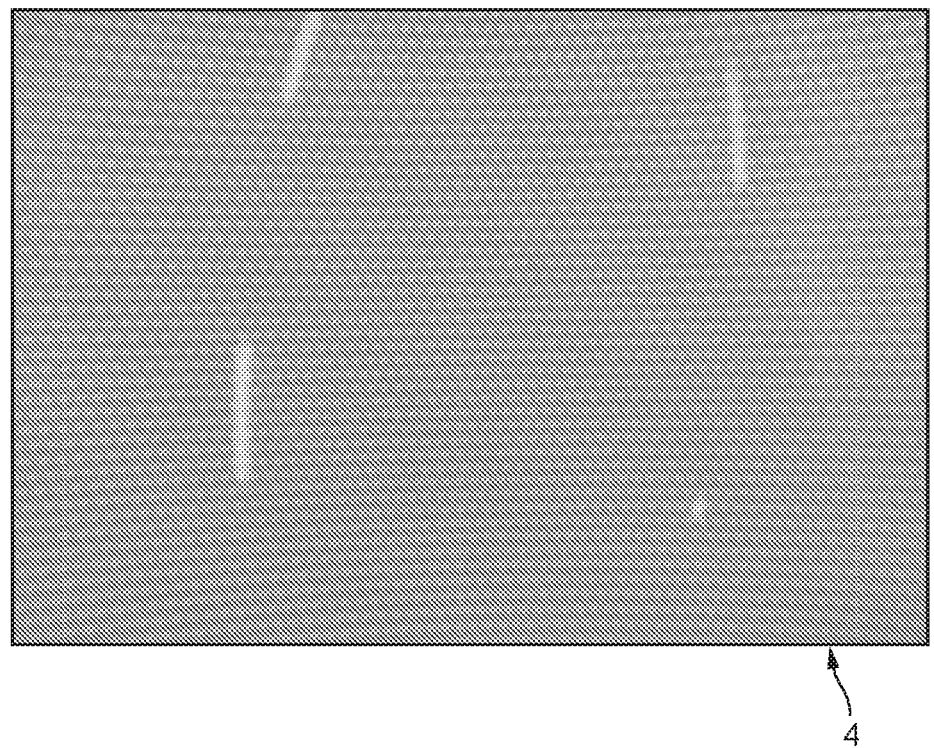

FIG. 6 shows a top view of a diffusive reflector sheet 4 produced at STEP V above. The pattern of individual and separate protrusions can clearly be seen in which the uppermost surface of each protrusion presents an isolated area arranged and disposed for forming a wetting interface with a light guide panel, as described above, whereby recesses in the surface of the interface material between protrusions are prevented, by virtue of being recessed, from forming such an interface.

Examples of formulations and implementations of the interface material and/or the transmission sheet are as follows. These formulations for the interface material may be used when the interface part is used in conjunction with a reflective or transmissive backing part (e.g. FIG. 3 or 4B or 4C).

Example 1

The formulation of the interface material comprised: 30 wt. % Phenylthioethyl acrylate and 10 wt. % EOEOA were mixed with 60 wt. % of Sartomer CN966H90 (from Arkema, previously-Sartomer) and mixed. Also, 3 wt % of photo-initiator Esacure KT046 from Lamberti and 1.5 wt. % of Irgacure 184 and 0.5 wt. % of Irgacure 1173 were added to it. The resulting formulation was applied on a diffusively reflective backing surface/part using a roll to roll UV coating machine and patterned as per the pattern designs discussed above. Alternatively, the resulting formulation may be applied on a polyester surface using a roll to roll UV coating machine and patterned as per the designs discussed above, and the resulting film may be then laminated on a commercial reflector film. This layer could be fixed on a clean glass or acrylic surface and removed multiple times without any loss of tackiness. A transparent patterned layer with spontaneous wetting properties and a refractive index of about 1.53 was achieved and this was laminated on a 4 mm thick clean Acrylic or glass slab. The layer could be applied on such surface and removed multiple times without any loss of tackiness. This resulting slab was then placed in a frame with LEDs on all 4 sides. A thin film diffuser was used at the top. When the LEDs were switched on, the panel resulted in a very uniform light much brighter than the commercial laser machined light guide panel with the same LEDs.

Example 2

The formulation of the interface material comprised: 24 wt. % Phenylthioethyl acrylate and 16 wt. % EOEOA were mixed with 55 wt. % of Sartomer CN965 (from Arkema, previously Sartomer) and mixed. Also, 3 wt % of photo-initiator Esacure KT046 from Lamberti and 1.5 wt. % of Irgacure 184 and 0.5 wt. % of Irgacure 1173 were added to it. The resulting formulation was applied on a polyester surface using a roll to roll UV coating machine and patterned as per the designs discussed above. This film was then laminated on a commercial reflector film. A resulting patterned layer showing good wetting properties was laminated on a 4 mm thick Acrylic slab with the help of a little pressure using a roller. This transparent layer could be fixed on a clean acrylic surface and removed multiple times without any loss of tackiness. This resulting slab was then assembled as an LED light panel with LEDs on all 4 sides and a thin film diffuser at the top. When the LEDs were switched on, the panel resulted in a very uniform light much brighter than the commercial laser machined light guide panel with the same LEDs.

Example 3

20 wt. % Sartomer CN131B, 25 wt. % Ethylhexyl Acrylate, 45 wt. % EOEOA and 20 wt. % CN9800 were mixed with 3 wt. % of Esacure KT046 from Lamberti and 1.5 wt. % of Irgacure 184 and 0.5 wt. % of Irgacure 1173 as photo-initiators and thoroughly mixed. The resulting formulation was applied on a polyester surface using a roll to roll UV coating machine and patterned as per the designs determined optically as discussed above. This film was then laminated on a commercial reflector film. This layer could be repositioned on an acrylic surface multiple times without any loss of tackiness. The layer was assembled into a LED panel as described above. It resulted in a bright LED panel light with very good uniformity.

Example 4

62.5 wt. % of Miramer SIP-900 was mixed with 35 wt. % of Sartomer CN9800 and 2.5 wt. % of Tego Photo-initiator A18 was added to it and mixed. This formulation was coated on a reflector film and patterned using an UV embossing machine. This resulted in a transparent, self-wetting layer with a refractive index of about 1.45 which easily wetted an acrylic light guide slab and could be easily removed and repositioned. When this film was laminated on a light guiding slab and the LED light from 4 strips of LEDs was coupled from all 4 sides, this resulted in a bright and uniform panel light.

Example 5

15 wt. % of Octafluoropentyl acrylate was mixed with 50 wt. % FluorAcryl 4298 and 30 wt. % of Miramer LR2000. 4 wt. % of Esacure KT046 and 1 wt. % of Irgacure 184 were added to these as photo-initiators and mixed well. This was applied to a 50 microns thick PET film pre-coated with a reflective coating and patterned using UV embossing. This resulted in a clear, wetting coating with a refractive index of less than 1.4. The coating easily wetted an acrylic light guide slab when laminated on it and gave a substantially uniform bright light when light from strips of LED was coupled to the light guide slab. The refractive index of such coating could be altered by altering the relative proportions of the constituents and this allowed altering the relative proportion of light extracted at the start and the centre of a lighting panel/luminaire.

Although a few preferred embodiments of the present invention have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A diffusive reflector for a lighting apparatus, the diffusive reflector comprising:
    a backing part upon a surface of which is disposed an interface part(s) wherein the interface part(s) is at least partially diffusively reflective optically and/or the backing part is diffusively reflective optically;
    a pedestal layer coupled to the backing part and having a plurality of separate protrusions thereon, wherein the interface part(s) is formed with the plurality of separate protrusions each adapted for making a separate respective contact interface with a surface of a light guide panel of the lighting apparatus to optically couple the backing part to the light guide panel via the interface part(s);
    wherein the interface part(s) comprises an optically transmissive interface material arranged to form said contact interface; and
    a material within recessed surface areas of the optically transmissive interface material and between neighboring protrusions of the plurality of separate protrusions, the material having a refractive index lower than the refractive index of the light guide panel and the interface, such that the interfacial energy thereof is reduced so that air is driven from the contact interface, whereby the critical angle for total internal reflection of light guided by the light guide panel is increased at said contact interface.

2. A diffusive reflector according to claim 1 in which the interface part(s) comprises optically scattering inclusions dispersed within the optically transmissive interface material thereby enabling diffusive scattering of light within the optically transmissive interface material.

3. A diffusive reflector according to claim 1 in which the interface part(s) is optically transmissive and is disposed on a surface of the backing part which is optically reflective, wherein the reflective backing part is diffusively, or in which the interface part(s) is diffusively reflective and said backing part is substantially non-reflective.

4. A diffusive reflector according to claim 1 in which said surface of the backing part comprises a coating of an optically transparent matrix material containing a dispersion of optically scattering inclusions thereby rendering said surface diffusively reflective.

5. A diffusive reflector according to claim 1 in which the interface part(s) is diffusively transmissive and said surface of the backing part is a substantially non-diffusive specular reflector or is diffusively reflective.

6. A diffusive reflector according to claim 1, wherein the interface part(s) comprises a plurality of void portions that include recessed surface areas of the interface material, and each of the plurality of void portions are positioned between neighboring protrusions of the plurality of separate protrusions.

7. A diffusive reflector according to claim 1, wherein the optically transmissive interface material is a tacky material permitting detachment and re-attachment of the diffusive reflector to the light guide panel.

8. A diffusive reflector according to claim 1, wherein the optically transmissive interface material includes a glass transition temperature less than or equal to about 20 degrees Celsius.

9. A light guide apparatus comprising:
a light guide panel comprising a panel surface;
a diffusive reflector including a backing part upon a surface of which is disposed an interface part(s), and a pedestal layer coupled to the backing part and having a plurality of separate protrusions thereon, wherein the interface part(s) comprises an optically transmissive interface material and is at least partially diffusively reflective optically and/or the backing part is diffusively reflective optically;
wherein the interface part(s) is formed with the plurality of separate protrusions which each make a separate respective contact interface with an area of the panel surface; and
a material within recessed surface areas of the interface material and between neighboring protrusions of the plurality of separate protrusions, the material having a refractive index lower than the refractive index of the light guide panel and the interface, such that the interfacial energy of the contact interface is reduced so that air is driven from the interface, whereby the critical angle for total internal reflection of light guided by the light guide panel is increased at said interface to optically couple the backing part to the light guide via the interface part(s).

10. A light guide apparatus according to claim 9 in which the interface part(s) comprises optically scattering inclusions dispersed within the optically transmissive interface material thereby enabling diffusive scattering of light within the optically transmissive interface material.

11. A light guide apparatus according to any of claim 9 in which the interface part(s) is optically transmissive and is disposed on a surface of the backing part which is optically reflective, wherein the reflective backing part is diffusively reflective or the interface part(s) is diffusively transmissive.

12. A light guide apparatus according to any of claim 9 in which the interface part(s) is substantially diffusively reflective and said surface of the backing part is substantially non-reflective.

13. A light guide apparatus according to claim 9 in which said surface of the backing part is optically rough, or is patterned or textured thereby providing a diffusively reflective surface.

14. A light guide apparatus according to claim 9 in which said surface of the backing part comprises a coating of an optically transparent matrix material containing a dispersion of optically scattering inclusions thereby rendering said surface diffusively reflective.

15. A light guide apparatus according to claim 9 in which the interface part(s) is diffusively transmissive and said surface of the backing part is a substantially non-diffusive specular reflector or is diffusively reflective.

16. A light guide apparatus according to claim 9, wherein the diffusive reflector includes a flexible sheet of material.

17. A light guide apparatus according to claim 9 in which the surface energy of the panel surface is higher than the surface energy of the interface material.

18. A light guide apparatus according to claim 9, wherein the interface part(s) comprises a self-wetting material adapted for wetting said surface of a light guide panel spontaneously, such that said wetting propagates without applied pressure.

19. A method of manufacturing a diffusive reflector for a lighting apparatus, the method comprising:
providing a backing part;
providing a pedestal layer coupled to the backing part and having a plurality of separate protrusions thereon;
providing an optically transmissive interface part having an interface material;
disposing a quantity of the interface material upon a surface of the backing part, and therewith;
forming an interface part(s) comprising the plurality of separate protrusions of the interface material each adapted for making a separate respective contact interface with a surface of a light guide panel of the lighting apparatus to optically couple the backing part to the light guide panel via the contact interface, wherein the interface part(s) is at least partially diffusively reflective optically and/or the backing part is diffusively reflective optically; and
forming a material within recessed surface areas of the optically transmissive interface material and between neighboring protrusions of the plurality of separate protrusions, the material having a refractive index lower than the refractive index of the light guide panel and the interface,
wherein the interface material is arranged to form said contact interface such that the interfacial energy thereof is reduced so that air is driven from the contact interface, whereby the critical angle for total internal reflection of light guided by the light guide panel is increased at said contact interface.

20. A method according to claim 19 wherein the interface part(s) is optically transmissive, and the method includes disposing the interface part(s) on a surface of the backing part which is optically reflective, wherein the reflective backing part is diffusively reflective or the interface part(s) is diffusively transmissive.

* * * * *